US010072816B2

(12) United States Patent
Shen et al.

(10) Patent No.: US 10,072,816 B2
(45) Date of Patent: Sep. 11, 2018

(54) MICROSTRUCTURE-BASED OPTICAL DIFFUSERS FOR CREATING BATWING AND OTHER LIGHTING PATTERNS

(71) Applicant: Bright View Technologies Corporation, Richmond, VA (US)

(72) Inventors: Bing Shen, Cary, NC (US); Ken G. Purchase, Morrisville, NC (US)

(73) Assignee: Bright View Technologies Corporation, Richmond, VA (US)

(*) Notice: Subject to any disclaimer, the term of this patent is extended or adjusted under 35 U.S.C. 154(b) by 484 days.

(21) Appl. No.: 14/308,293

(22) Filed: Jun. 18, 2014

(65) Prior Publication Data

US 2014/0376220 A1    Dec. 25, 2014

Related U.S. Application Data

(60) Provisional application No. 61/836,822, filed on Jun. 19, 2013.

(51) Int. Cl.
| | |
|---|---|
| *F21V 5/02* | (2006.01) |
| *F21K 99/00* | (2016.01) |
| *B29D 11/00* | (2006.01) |
| *F21V 5/00* | (2018.01) |
| *G02B 5/02* | (2006.01) |
| *B29L 11/00* | (2006.01) |
| *F21S 11/00* | (2006.01) |

(Continued)

(52) U.S. Cl.
CPC ............ *F21V 5/02* (2013.01); *B29D 11/0074* (2013.01); *F21V 5/005* (2013.01); *G02B 5/0231* (2013.01); *B29L 2011/00* (2013.01); *F21S 11/00* (2013.01); *F21V 13/04* (2013.01); *F21Y 2115/10* (2016.08)

(58) Field of Classification Search
CPC .. F21S 11/00; B29L 2011/00; B29D 11/0074; G02B 5/0231; F21V 5/005; F21V 5/02; F21V 13/04
USPC ................ 362/235, 330, 620, 339, 626, 337
See application file for complete search history.

(56) References Cited

U.S. PATENT DOCUMENTS

| 586,211 A | 7/1897 | Basquin |
|---|---|---|
| 821,307 A | 5/1906 | Mygatt |
| (Continued) | | |

FOREIGN PATENT DOCUMENTS

| CN | 102016395 | 4/2011 |
|---|---|---|
| CN | 102252222 | 11/2011 |
| (Continued) | | |

OTHER PUBLICATIONS

International Search Report and Written Opinion Corresponding to International Application No. PCT/US2014/070586; dated Mar. 18, 2015; 13 Pages.

(Continued)

*Primary Examiner* — Bao Q Truong
*Assistant Examiner* — Arman B Fallahkhair
(74) *Attorney, Agent, or Firm* — Myers Bigel, P.A.

(57) ABSTRACT

A light transmissive structure includes a light transmissive substrate having first and second opposing faces and array of microprism elements on the first face, with a respective microprism element including a plurality of concentric microprisms. The light transmissive structure is configured to receive light from a light source facing the first face and distribute the light emerging from the second face in a 2D batwing distribution.

38 Claims, 30 Drawing Sheets

(51) Int. Cl.
*F21V 13/04* (2006.01)
*F21Y 115/10* (2016.01)

(56) References Cited

U.S. PATENT DOCUMENTS

| | | | |
|---|---|---|---|
| 2,394,992 A | 2/1946 | Franck | |
| 3,288,990 A | 11/1966 | Stahlhut | |
| 3,329,812 A * | 7/1967 | Harling | F21V 13/04 362/223 |
| 3,647,148 A | 3/1972 | Wince | |
| 3,721,818 A | 3/1973 | Stahlhut | |
| 3,725,697 A | 4/1973 | Wince | |
| 3,735,124 A | 5/1973 | Stahlhut | |
| 3,764,800 A | 10/1973 | Clostermann | |
| 3,829,680 A | 8/1974 | Jones | |
| 3,866,036 A | 2/1975 | Taltavull | |
| 3,978,332 A | 8/1976 | Taltavull | |
| 4,161,015 A | 7/1979 | Dey et al. | |
| 4,233,651 A | 11/1980 | Fabbri | |
| 4,300,185 A | 11/1981 | Wakamatsu | |
| 4,428,673 A | 1/1984 | Yoshida | |
| 4,542,449 A | 9/1985 | Whitehead | |
| 4,615,579 A | 10/1986 | Whitehead | |
| 4,750,798 A | 6/1988 | Whitehead | |
| 4,791,540 A | 12/1988 | Dreyer, Jr. et al. | |
| 4,805,984 A | 2/1989 | Cobb, Jr. | |
| 4,834,495 A | 5/1989 | Whitehead et al. | |
| 4,850,665 A | 7/1989 | Whitehead | |
| 4,906,070 A | 3/1990 | Cobb, Jr. | |
| 4,969,075 A | 11/1990 | Helm et al. | |
| 4,984,144 A | 1/1991 | Cobb, Jr. et al. | |
| 5,105,345 A | 4/1992 | Katoh et al. | |
| 5,149,191 A | 9/1992 | Lewin et al. | |
| 5,189,530 A | 2/1993 | Whitehead | |
| 5,193,899 A | 3/1993 | Oe et al. | |
| 5,243,506 A | 9/1993 | Whitehead | |
| 5,309,544 A | 5/1994 | Saxe | |
| 5,339,382 A | 8/1994 | Whitehead | |
| 5,475,785 A | 12/1995 | Johanson | |
| 5,483,119 A | 1/1996 | Johanson | |
| 5,715,347 A | 2/1998 | Whitehead | |
| 5,745,632 A | 4/1998 | Dreyer | |
| 5,845,037 A | 12/1998 | Miekis | |
| 5,854,872 A | 12/1998 | Tai | |
| 5,997,156 A | 12/1999 | Perlo et al. | |
| 6,280,052 B1 | 8/2001 | White | |
| 6,331,915 B1 | 12/2001 | Myers | |
| 6,568,822 B2 | 5/2003 | Boyd et al. | |
| 6,612,723 B2 | 9/2003 | Futhey et al. | |
| 6,698,908 B2 | 3/2004 | Sitzema, Jr. et al. | |
| 6,863,420 B1 | 3/2005 | Schütz | |
| 6,953,264 B2 * | 10/2005 | Ter-Hovhannisian | B60Q 1/32 362/241 |
| 7,190,387 B2 | 3/2007 | Rinehart et al. | |
| 7,192,692 B2 | 3/2007 | Wood et al. | |
| 7,229,192 B2 | 6/2007 | Mayfield, III et al. | |
| 7,261,435 B2 | 8/2007 | Gould et al. | |
| 7,273,299 B2 | 9/2007 | Parkyn et al. | |
| 7,364,341 B2 * | 4/2008 | Parker | F21V 5/00 359/599 |
| 7,422,347 B2 | 9/2008 | Miyairi et al. | |
| 7,452,093 B2 * | 11/2008 | Nagao | G02B 6/0031 362/309 |
| 7,537,374 B2 | 5/2009 | Schardt et al. | |
| 7,658,513 B2 | 2/2010 | Peck | |
| 7,658,514 B2 | 2/2010 | Lee et al. | |
| 7,660,039 B2 | 2/2010 | Santoro et al. | |
| 7,674,018 B2 | 3/2010 | Holder et al. | |
| 7,726,828 B2 * | 6/2010 | Sato | G02B 6/0043 362/341 |
| 7,731,395 B2 | 6/2010 | Parkyn et al. | |
| 7,815,355 B2 | 10/2010 | Thompson et al. | |
| 7,837,361 B2 | 11/2010 | Santoro et al. | |
| 7,867,695 B2 | 1/2011 | Freese et al. | |
| 7,903,308 B2 * | 3/2011 | Commander | B42D 25/29 283/85 |
| 7,942,559 B2 | 5/2011 | Holder et al. | |
| 7,993,036 B2 | 8/2011 | Holder et al. | |
| 8,047,673 B2 | 11/2011 | Santoro | |
| 8,197,103 B2 * | 6/2012 | Chang | G02B 5/0215 362/244 |
| 8,210,722 B2 | 7/2012 | Holder et al. | |
| 8,338,199 B2 | 12/2012 | Lerman et al. | |
| 8,339,716 B2 | 12/2012 | Premysler | |
| 8,485,687 B2 * | 7/2013 | McQuistian | F21V 7/0083 362/230 |
| 8,733,970 B2 * | 5/2014 | Kim | G02B 6/0051 349/62 |
| 8,746,923 B2 * | 6/2014 | Ashdown | G02B 19/0066 362/240 |
| 9,765,949 B2 * | 9/2017 | Shen | F21V 13/04 |
| 2001/0019748 A1 | 9/2001 | Beeson et al. | |
| 2002/0034012 A1 | 3/2002 | Santoro et al. | |
| 2004/0141308 A1 | 7/2004 | Saccomanno | |
| 2005/0024754 A1 | 2/2005 | Epstein et al. | |
| 2005/0105880 A1 | 5/2005 | Randall | |
| 2005/0201103 A1 | 9/2005 | Saccomanno et al. | |
| 2007/0058391 A1 | 3/2007 | Wilson et al. | |
| 2007/0201225 A1 | 8/2007 | Holder et al. | |
| 2008/0198469 A1 | 8/2008 | Yuba et al. | |
| 2008/0231976 A1 | 9/2008 | Commander et al. | |
| 2008/0233519 A1 | 9/2008 | Wood et al. | |
| 2008/0247170 A1 | 10/2008 | Peck | |
| 2008/0303977 A1 | 12/2008 | Sekiguchi et al. | |
| 2009/0225543 A1 | 9/2009 | Jacobson et al. | |
| 2009/0296401 A1 | 12/2009 | Gutierrez, Jr. | |
| 2010/0128489 A1 | 5/2010 | Holder et al. | |
| 2010/0165625 A1 | 7/2010 | Holder et al. | |
| 2011/0074056 A1 | 3/2011 | Louh | |
| 2011/0141727 A1 | 6/2011 | Li et al. | |
| 2011/0157889 A1 | 6/2011 | Chang et al. | |
| 2011/0216537 A1 | 9/2011 | Holder et al. | |
| 2011/0216544 A1 | 9/2011 | Holder et al. | |
| 2012/0155093 A1 * | 6/2012 | Yamada | H01L 51/5275 362/311.01 |
| 2012/0268934 A1 | 10/2012 | Holder et al. | |
| 2012/0275150 A1 | 11/2012 | Yokotani et al. | |
| 2012/0275185 A1 | 11/2012 | Edamitsu et al. | |
| 2013/0039090 A1 | 2/2013 | Dau et al. | |
| 2013/0042510 A1 | 2/2013 | Nall et al. | |
| 2013/0044476 A1 | 2/2013 | Bretschneider et al. | |
| 2013/0044513 A1 | 2/2013 | Pan | |
| 2013/0070478 A1 | 3/2013 | Edamitsu et al. | |
| 2013/0141909 A1 | 6/2013 | Ashdown et al. | |
| 2014/0000710 A1 | 1/2014 | Nakahara et al. | |
| 2015/0029717 A1 * | 1/2015 | Shen | F21V 5/005 362/235 |

FOREIGN PATENT DOCUMENTS

| | | |
|---|---|---|
| CN | 102760823 | 10/2012 |
| CN | 202532218 U | 11/2012 |
| CN | 102954406 | 3/2013 |
| EP | 0 855 044 A1 | 7/1998 |
| EP | 1 311 879 A2 | 5/2003 |
| EP | 1 925 878 A1 | 5/2008 |
| EP | 1 994 389 A2 | 11/2008 |
| EP | 2 112 426 A2 | 10/2009 |
| EP | 2 142 849 A1 | 1/2010 |
| EP | 2 263 036 A1 | 12/2010 |
| EP | 2 270 557 A1 | 1/2011 |
| EP | 2 333 591 A2 | 6/2011 |
| EP | 2 383 560 A1 | 11/2011 |
| EP | 2 383 561 A1 | 11/2011 |
| EP | 2 383 562 A1 | 11/2011 |
| EP | 2 515 031 A1 | 10/2012 |
| EP | 2 518 395 A2 | 10/2012 |
| EP | 2 560 155 A2 | 2/2013 |
| WO | WO 02/08799 A2 | 1/2002 |
| WO | WO 2007/100837 A2 | 9/2007 |
| WO | WO 2008/140884 A1 | 11/2008 |
| WO | WO 2009/096685 A2 | 8/2009 |

(56) References Cited

FOREIGN PATENT DOCUMENTS

| WO | WO 2009/110976 A1 | 9/2009 |
| WO | WO 2012/109141 A1 | 8/2012 |
| WO | WO 2012/124728 A1 | 9/2012 |
| WO | WO 2012/141899 A1 | 10/2012 |

OTHER PUBLICATIONS

International Search Report and Written Opinion Corresponding to International Application No. PCT/US2014/042851; dated Oct. 29, 2014; 11 Pages.
Fusion Optix, Inc., http://web.archive.org/web/20130909163400/ http://fusionoptix.com/lighting/components/light-shapers.htm, 2 pages, 2012.
Waldmann Lighting, Technical Data for Ataro: Indirect Lighting Family, 36 pages, available as a filing date.
International Preliminary Report on Patentability Corresponding to International Application No. PCT/US2014/042851; dated Dec. 30, 2015; 9 Pages.
European Search Report Corresponding to Application No. 14 81 4231; dated Nov. 11, 2016; 8 Pages.
European Office Action for application No. 14814231.8 dated Feb. 19, 2018, 5 pages.
Extended European Search Report for corresponding application No. 14895200.5 dated Feb. 7, 2018, 8 pages.

\* cited by examiner

Section A-A

Section A-A

Section B-B

Light Exiting Opening

Light Exiting Opening

MICROSTRUCTURE-BASED OPTICAL DIFFUSERS FOR CREATING BATWING AND OTHER LIGHTING PATTERNS

RELATED APPLICATION

This application claims priority from U.S. Provisional Application No. 61/836,822, filed Jun. 19, 2013, the disclosure of which is hereby incorporated herein in its entirety.

BACKGROUND

Various embodiments described herein relate to light sources, particularly luminaires, for providing special lighting patterns. These embodiments have particular, but not exclusive, usefulness in providing what is known in the art as "batwing" lighting patterns.

In many illumination systems, targeted areas to be illuminated are much larger than an emitting area of the light sources. Many artificial light sources emit light in an approximately Lambertian distribution. When illuminated from above by such a source, flat targeted areas such as roads, floors, or a work surface cannot be illuminated uniformly without modifying the intensity distribution of the light source. When a light source with Lambertian intensity distribution illuminates a flat surface from above, the intensity on that surface will be greatest directly under the light source, and will decrease monotonically for points on the surface farther away. A "batwing" distribution, conversely, reduces the intensity at nadir (directly under the light source) and increases the intensity at angles up to some maximum angle, such that the surface is illuminated substantially uniformly for angles less than the maximum angle. Batwing light distributions can exist in several forms: one-dimensional (1D) batwings have a batwing shape only to the sides (e.g. East-West direction) and are often used with linear lighting. Two-dimensional (2D) circular batwing distributions create a batwing "cone" of light, illuminating evenly in all radial directions to achieve a disc-shaped area of uniform illumination on a flat surface. 2D square or rectangular batwings create a batwing "pyramid" of light, illuminating evenly in both North-South and East-West directions to achieve a square- or rectangular-shaped area of uniform illumination on a surface, substantially filling in dark corners between luminaires arrayed in a square or rectangular array on a ceiling. Because it is common to light areas such as warehouses and offices using lighting fixtures in a rectangular array on a ceiling, the rectangular batwing light distribution is highly desirable. Frequently luminaires with batwing distributions can provide the desired uniformity of illumination at a greater luminaire-to-luminaire spacing than with Lambertian luminaires, meaning that fewer luminaires are necessary to illuminate the desired area, saving cost. In addition, the nadir suppression involved in a batwing distribution means minimum lighting levels can be met across the surface without far exceeding that minimum level at the nadir, which would unnecessarily waste energy.

A downward-facing light source with Lambertian light distribution has luminous intensity that is proportional to the cosine of the angle from nadir (the downward-facing direction). A Lambertian light distribution is represented in polar coordinates in FIG. 1. When a flat surface such as a floor is illuminated by a Lambertian light distribution, the illuminance on the floor is greatest at nadir (directly under the fixture) and decreases monotonically for points on the floor away from nadir. The central brightness is often referred to as a "hot spot" in the lighting industry, and is generally undesirable. By definition, the Full Width at Half Maximum (FWHM) of a Lambertian distribution is 120 degrees. In the lighting industry, the term "Lambertian" is also frequently used to refer to light distributions with similar quality but of different widths. That is, distributions that have a peak at nadir, and monotonically decrease at higher angles are often called Lambertian. In one example, a Gaussian distribution with FWHM of 80 degrees will often be called "Lambertian" in the lighting industry. Lambertian distributions are not batwing distributions.

For a single ceiling luminaire, which is small compared to the ceiling-to-floor distance, to uniformly illuminate a specified width across a flat surface such as a floor, it generally must emit light in a batwing distribution whose luminous intensity is inversely proportional to the cube of the cosine of the angle from nadir for angles less than the maximum angle. This theoretical distribution can be represented by the solid curve in FIG. 2, in which no light extends beyond the maximum angle. In practice, multiple luminaires are generally used to illuminate a surface such as a room, warehouse, or roadway, and it is desirable to have some overlap, or crossfade, between the light distributions emitted by each light source. Thus a practical batwing light distribution often has some light extending beyond the maximum angle, as illustrated in the dashed curve of FIG. 2. The sharp "peaks" of the light distribution in the solid curve are also disadvantageous because they can be noticeable to a viewer, and are hard to create in practice. The dashed curve of FIG. 2 shows more practical rounded peaks in the light distribution.

In practice, it is acceptable to have some level of variation of the illuminance on a surface. For various lighting applications, an illuminance variation of about 50%, 20%, 10%, 5%, or less may be acceptable across the surface of interest when illuminated by an array of luminaires. Because the specified level of variation allows for some deviation from ideal conditions, the batwing diffuser is allowed to have a light distribution that doesn't exactly follow the $1/\cos^3$ distribution. This imperfection is illustrated in central portion of the dashed curve in FIG. 2.

In lighting, batwing light distributions different from the typical inverse cosine cubed shape are also used. These may be desired, for example, in a library or store, in which it may be desired to illuminate vertical surfaces of shelves holding books or items. For these and other lighting applications, a degree of nadir suppression may be desirable that is greater or less than the typical inverse cosine cubed shape.

High-efficiency LED lighting is being increasingly adopted. Typical LED light sources emit light into a Lambertian distribution with a Full Width Half Max (FWHM) of approximately 120 degrees. Although LEDs with many other light distributions are available, many cost-effective LEDs sold for general lighting are of the 120 degree Lambertian variety. Many luminaires (LED and traditional) have flat outer surfaces (such as some downlights, task lights, and troffers). In many of these fixtures, a simple flat diffuser (such as a microstructured, holographic, or volumetric diffuser) is used to diffuse the LEDs, hiding their appearance from viewers and smoothing the surface appearance of the luminaire. These diffusers do not produce 2D batwing distributions. Rather, they typically give Lambertian distributions of various widths (most typically about 80 to 120 degrees).

SUMMARY

Light transmissive structures according to various embodiments described herein include a light transmissive substrate having first and second opposing faces and array of microprism elements on the first face, with a respective microprism element comprising a plurality of concentric microprisms. The light transmissive structure is configured to receive light from a light source facing the first face and distribute the light emerging from the second face in a 2D batwing distribution.

In some embodiments, the array of microprism elements extends over substantially the entire first face of the substrate.

In some embodiments, a respective microprism element includes a plurality of concentric circular microprisms. At least some of the microprisms may have a generally triangular cross section with a peak, with the cross section taken in a plane perpendicular to the first face of the substrate, and may have a prism internal angle defined by the peak that varies as a function of a prism orientation angle that is measured relative to an edge of the substrate. In some embodiments, portions of the microprisms having prism orientation angles of about 45 degrees and 135 degrees have a prism internal angle that is less than a prism internal angle of portions of the microprisms having prism orientation angles of about 0 degrees and 90 degrees.

In some embodiments, a respective microprism element includes a plurality of concentric elliptical microprisms.

In some embodiments, a respective microprism element includes a plurality of concentric rounded square microprisms. A respective rounded square microprism may have a shape that fits between a square and its inscribed circle. At least some of the microprisms may have a generally triangular cross section with a peak, with the cross section taken in a plane perpendicular to the first face of the substrate, and may have a prism internal angle defined by the peak that varies as a function of a prism orientation angle that is measured relative to an edge of the substrate. In some embodiments, portions of the microprisms having prism orientation angles of about 45 degrees and 135 degrees have a prism internal angle that is less than a prism internal angle of portions of the microprisms having prism orientation angles of about 0 degrees and 90 degrees.

In some embodiments, a respective microprism element is generally hexagonal. In some embodiments, a respective microprism element is generally square.

In some embodiments, a respective microprism element includes a plurality of concentric rounded rhombus microprisms. A respective rounded rhombus microprism may have a shape that fits between a rhombus and its inscribed ellipse. At least some of the microprisms may have a generally triangular cross section with a peak, with the cross section taken in a plane perpendicular to the first face of the substrate, and may have a prism internal angle defined by the peak that varies as a function of a prism orientation angle that is measured relative to an edge of the substrate.

A respective microprism element may include concentric microprisms of random or pseudorandom size and/or shape. A respective microprism element may be longer in a first direction along the substrate than in a second, orthogonal direction along the substrate.

In some embodiments, a respective microprism element has an area of less than about 1 square centimeter on the second face of the substrate. In some embodiments, a respective microprism element has an area of about 0.1 square centimeters or less on the second face of the substrate. In some embodiments, a respective microprism is undetectable by the naked eye.

In some embodiments, at least some of the microprisms have a generally triangular cross section with a peak, with the cross section taken in a plane perpendicular to the first face of the substrate. The peak may be generally parallel to the first face of the substrate. The peak may be a sharp peak. The peak may be a rounded peak. In some embodiments, (i) a respective microprism has an internal angle defined by the peak of between about 60 and 100 degrees; and/or (ii) a respective microprism has a pitch of between about 10 microns and 3 mm. In some embodiments, (i) a respective microprism has an internal angle of between about 70 and 90 degrees; and/or (ii) a respective microprism has a pitch of between about 10 microns and 1 mm.

In some embodiments, substantially all of the microprism elements include a plurality of concentric microprisms.

In some embodiments, adjacent microprism elements are in contact with one another.

In some embodiments, the array of microprism elements includes gaps between at least some of the microprism elements, and the light transmissive structure further includes gap-filling microstructures in at least some of the gaps.

In some embodiments, at least some of the microprisms have a generally triangular cross section with a peak, with the cross section taken in a plane perpendicular to the first face of the substrate, and with the peak having a height relative to the first face of the substrate that varies as a function of a prism orientation angle that is measured relative to an edge of the substrate.

In some embodiments, the light transmissive structure is configured to receive light having a Lambertian distribution from a light source facing the first face and distribute the light emerging from the second face in a 2D batwing distribution. In some embodiments, the light transmissive structure is configured to receive light having a light distribution having a Full Width at Half Maximum (FWHM) of at least about 30 degrees from a light source facing the first face and distribute the light emerging from the second face in a 2D batwing distribution. In some embodiments, the light transmissive structure is configured to receive light having a light distribution having a Full Width at Half Maximum (FWHM) of at least about 40 degrees from a light source facing the first face and distribute the light emerging from the second face in a 2D batwing distribution. In some embodiments, the light transmissive structure is configured to receive light having a light distribution having a Full Width at Half Maximum (FWHM) of at least about 60 degrees from a light source facing the first face and distribute the light emerging from the second face in a 2D batwing distribution.

In some embodiments, the light transmissive structure is configured to receive light having a light distribution having a Full Width at Half Maximum (FWHM) of at least about 80 degrees from a light source facing the first face and distribute the light emerging from the second face in a 2D batwing distribution.

In some embodiments, the light transmissive structure includes at least one diffusion feature, and the light transmissive structure is configured to receive collimated and/or near-collimated light from a light source facing the first face and distribute the light emerging from the second face in a 2D batwing distribution. The diffusion feature may include surface roughness on at least some of the microprisms. The diffusion feature may include a diffuser on the second face of the substrate. The diffusion feature may include a light scattering agent in at least some of the microprisms and/or in the substrate. The diffusion feature may include a diffusive coating on at least some of the microprisms.

In some embodiments, a respective microprism follows a prism path along the first face of the substrate. The microprism may have a generally triangular cross section with a peak and a pitch, with the cross section taken in a plane perpendicular to the first face of the substrate. The peak may have a height relative to the first face of the substrate that varies along the prism path and/or the pitch may vary along the prism path.

In some embodiments, the light transmissive structure is in combination with at least one light source and a housing that is configured to hold the at least one light source and the light transmissive substrate so that light from the light source impinges on the first face of the substrate and emerges from the second face of the substrate in a 2D batwing distribution. The housing may define a light exit surface area where the substrate is held. In various embodiments, a respective microprism element has an area on the first face of the substrate that is at least one order or magnitude, at least two orders of magnitude, and/or at least four orders of magnitude smaller than the light exit surface area. In some embodiments, the array of microprism elements on the first face of the substrate extends over substantially the entire light exit surface area.

In some embodiments, the light transmissive structure is in combination with at least one light source wherein the light transmissive substrate is suspended under the light source so that light from the light source impinges on the first face of the substrate and emerges from the second face of the substrate in a 2D batwing distribution.

Light transmissive structures may be fabricated according to various embodiments described herein by imaging onto a photoimageable material an image of a plurality of microprisms having a geometric feature that is configured to distribute light transmitted through the microprisms in a 2D batwing distribution. The photoimageable material that was imaged is then used to replicate an image of a plurality of microprisms in and/or on a substrate, the plurality of microprisms also having a geometric feature that is configured to distribute light transmitted through the microprisms in a 2D batwing distribution. The imaging may be performed by scanning a laser across the photoimageable material, the laser defining the image of a plurality of microprisms having the geometric feature that is configured to distribute light transmitted through the microprisms in a 2D batwing distribution.

Light transmissive structures according to various embodiments described herein include a light transmissive substrate having first and second opposing faces. A plurality of microprisms are on the first face, with the microprisms having a generally triangular cross section in a plane that is perpendicular to the first face, and the microprisms are distributed on the first face of the substrate in a plurality of different prism orientation angles measured from an edge of the substrate. The light transmissive structure is configured to receive light having a Full Width at Half Maximum (FWHM) of at least about 30 degrees and/or Lambertian light at the first face and distribute the light emerging from the second face in a 2D batwing distribution. In some embodiments, the light transmissive structure is configured to receive light having a Full Width at Half Maximum (FWHM) of at least about 40 degrees and/or Lambertian light at the first face and distribute the light emerging from the second face in a 2D batwing distribution.

In some embodiments, the microprisms are distributed on the first face of the substrate generally equally in each of the plurality prism orientation angles. In some embodiments, microprisms having a prism orientation angle of about 45 and 135 degrees are distributed on a greater area of the first face of the substrate than microprisms having a prism orientation angle of about 0 and 90 degrees. In some embodiments, the microprisms have an internal angle that varies as a function of prism orientation angle. In some embodiments, the plurality of microprisms and/or interspersed microstructures substantially cover the first face of the substrate.

Light transmissive structures according to various embodiments described herein include a light transmissive substrate having first and second opposing faces. An array of microprism elements is on the first face, with a respective microprism element including a plurality of concentric microprism patterns, and with a respective microprism pattern including a plurality of pyramids arranged in a generally elliptical configuration. The light transmissive structure is configured to receive light from a light source facing the first face and distribute the light emerging from the second face in a 2D batwing distribution.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

DETAILED DESCRIPTION

For collimated light, beam shaping is well known in the art. Refractive and diffractive elements exist that can form a (collimated) laser beam into a specific shape. Such elements are available commercially, for example, from Jenoptik, Jena, Germany (http://www.jenoptik.com/en-microoptics-refractive-optical-elements-ROEs). These elements can shape a laser beam into a line, crosshair, square, circle, and even images (such as corporate logos) to project on a surface, and are commonly used in machine-vision applications. Beam shapers generally require substantially collimated light. As is shown by the review of prior art herein, a shaper does not appear to currently exist that can convert a Lambertian distribution into a 2D batwing distribution, despite the value the lighting industry would place on having such a product.

A 90-degree linear prism optic has one smooth surface and the other one is textured by an array of linear prisms with 45-degree sidewalls, as shown in U.S. Pat. No. 3,288, 990 and U.S. Pat. No. 4,542,449, in which one or two layers of prism optics are used to increase brightness directly under a luminaire, and reduce high-angle brightness. A film with the same properties is described in U.S. Pat. No. 4,906,070. A common application of such a prism film is for brightness enhancement of the back light unit inside a display system. In both lighting and displays, a brightness-enhancing prism is used with the light entering smooth surface of the optic, and thus the prisms facing away from the light source. Rays incident perpendicular to the surface of the film will encounter total internal reflections (TIR) from the prisms. Those light rays are generally reflected back into the backlight, which is generally configured with high reflectivity to recirculate those rays back toward the prism film (sometimes repeatedly), until they enter the prism film at larger incident angle and are allowed to pass to the viewer of display. Rays incident at larger angles are at least in part refracted through the prisms, and on average over all angles, the average exit angles are smaller than the average entrance angles, when measured relative to the normal to the prism optic. The angle bending and recirculation process creates a narrower FWHM light distribution (approx 70-95 degrees) than the incident Lambertian distribution (approx 120 degrees), and on-axis brightness enhancement. Said another way, a prism illuminated by Lambertian light in this orientation and with appropriate recirculation will increase intensity at the nadir, while reducing the FWHM. Thus, a prism used in this manner does not create a batwing distribution.

Figure 1:
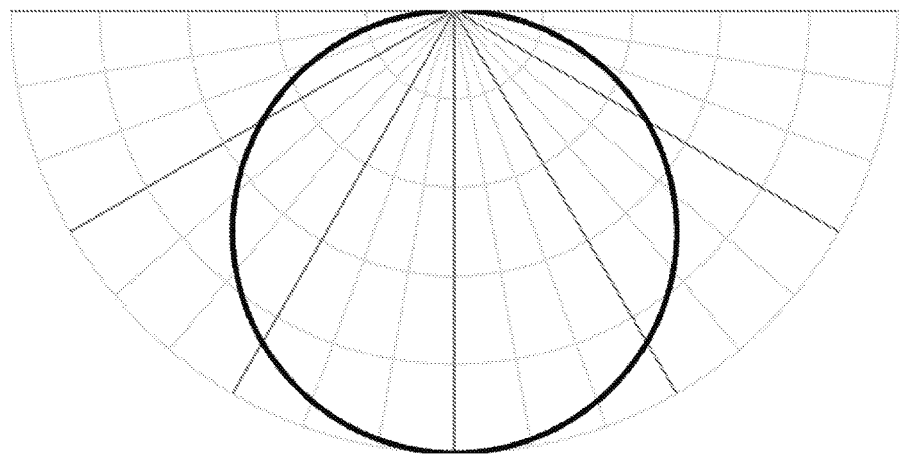
FIG. 1 is a chart illustrating a Lambertian intensity distribution with a Full Width Half Maximum (FWHM) of 120 degrees.
Figure 2:
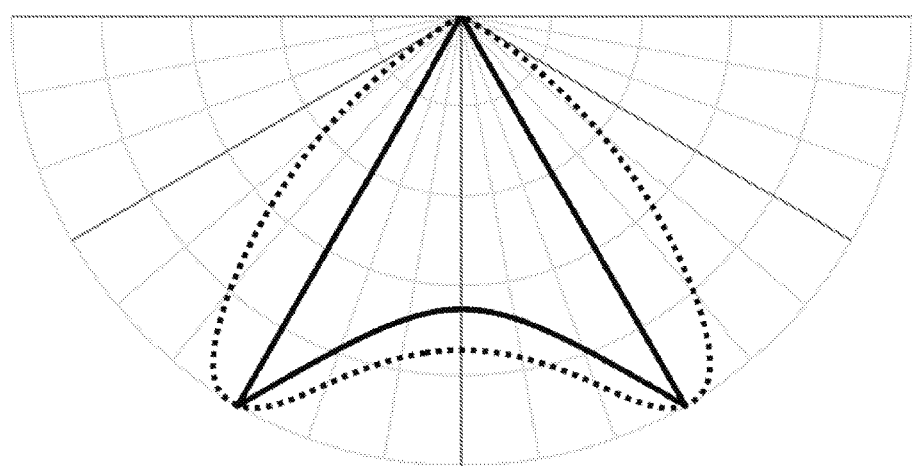
FIG. 2 is a chart illustrating theoretical and practical batwing distributions.
Figure 3A:
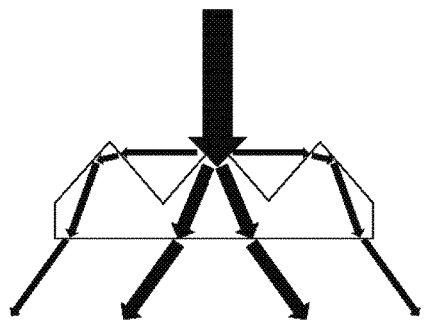
FIG. 3A is a cross-sectional view of collimated light impinging a linear prism film.
Figure 3B:
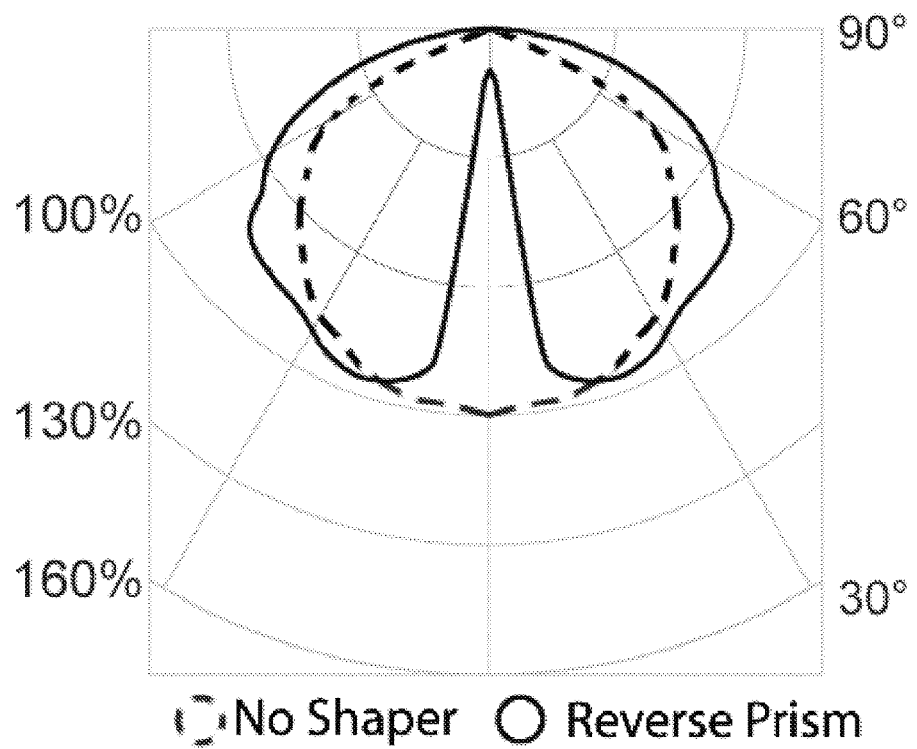
FIG. 3B is a chart illustrating a Lambertian light source distribution (dotted curve) and the 1D split distribution of the Lambertian light source after passing through the linear prism film of FIG. 3A with the prism texture facing the light source (solid curve).

In contrast, it is known that if the light enters the prism side (rather than the smooth side) of a linear prism film or optic, it will exit in two lobes, similar to a 1D batwing shape (as mentioned in U.S. Pat. No. 4,300,185 or U.S. Pat. No. 4,233,651). FIG. 3A illustrates how collimated light will be divided (refracted) into two branches by prism structures. The angular deviation of this refraction is determined by the refractive index of the material, and the sidewall angle of the prisms. Typical refractive indices for prism films are in the range of 1.45 to 1.6. Smaller prism internal angle or greater refractive index will result in larger refraction angles. Even Lambertian light impinging onto the prism side of a linear prism film will exit that film in a 1D split distribution, in which light is approximately a batwing shape. This use of a linear prism is referenced on the Fusion Optix website at http://fusionoptix.com/lighting/components/light-shapers.htm (as of May 17, 2013), a diagram adapted from which is shown in FIG. 3B. The reduction of light intensity at theta (θ)=0 degrees (straight down in the image) is called "nadir suppression."

Measurement

Figure 4:
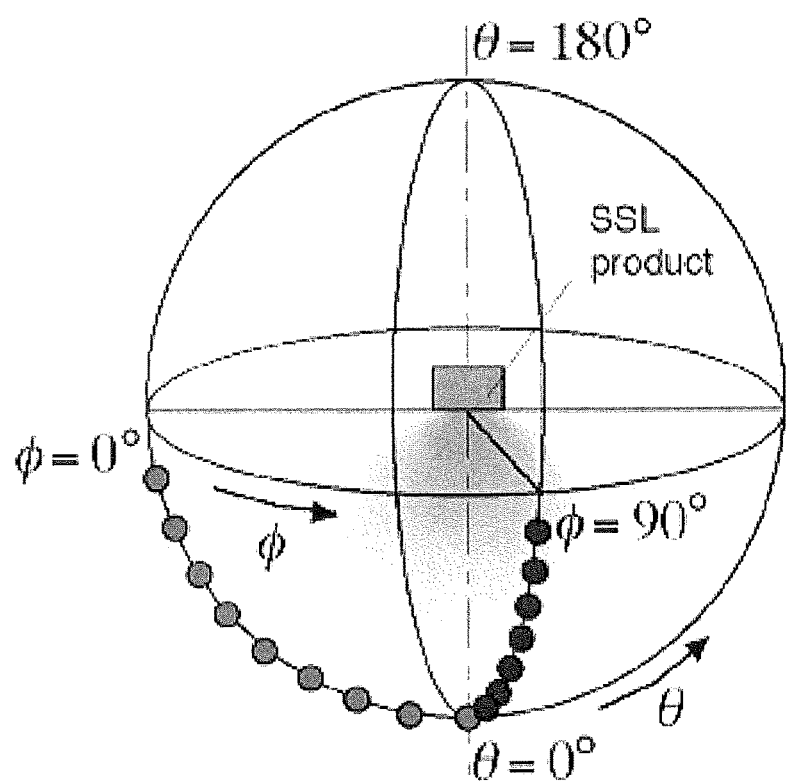
FIG. 4 is a chart illustrating the measurement of light distributions in a spherical coordinate system.

Light distributions are typically measured using goniometric apparatus similar to that described in the IES LM-79 standard, as illustrated in FIG. 4. In the figure, a luminaire or illuminated optical device is depicted (labeled SSL product) emitting light in a downward dimension. The two circles with dots on their perimeters represent planes at two different azimuthal angles φ (phi). In each of these planes, the polar angle θ (theta, ranging from −180 to 180 degrees) is defined as indicated. Example measurement points in the phi=0 degree and phi=90 degree planes are depicted as dots. At each of these points, luminous intensity is measured as a function of the theta angle from the principle axis of the light source. This luminous intensity is measure by an optical detector, the optical detector and/or light source moved relative to each other so that the optical detector measures light at the desired angles. In practice a light source can be measured at any group of phi and theta points desired. Many lights emit generally in one hemisphere, and thus theta will often be measured from −90 to 90 degrees.

Figure 5:
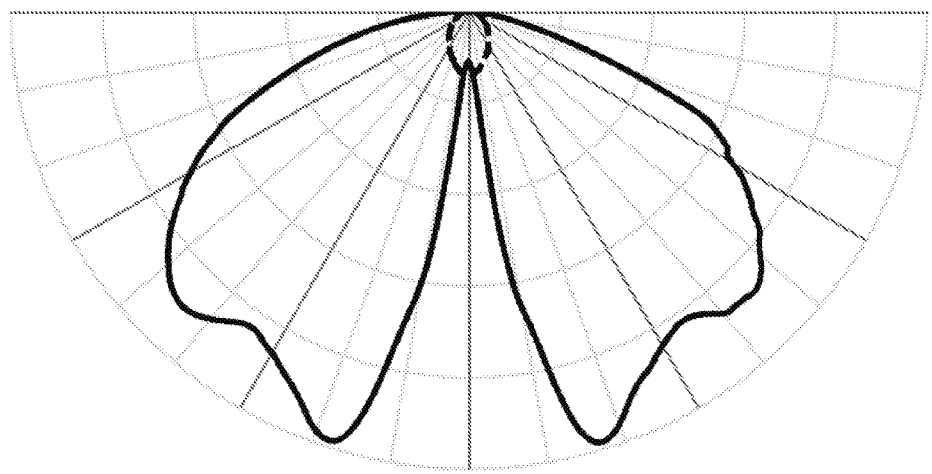
FIG. 5 is a chart illustrating the light distribution of a Lambertian light source after passing through a linear prism film with prism texture facing the light source.

Confirming the data presented in FIG. 3B, FIG. 5 shows the light intensity distribution measured by the applicant by illuminating a flat prism film with a Lambertian LED light source, with the prism side facing the light. The solid line represents the measurement made in a plane designated phi=90 degrees that is perpendicular to the orientation of the linear prisms on the prism film. The dashed line shows the phi=0 degree plane parallel to the prism orientation, and shows the output distribution is Lambertian.

It is often unsatisfactory, however, to utilize only a linear prism film directly in a lighting application. One skilled in the art will recognize that the distribution shown in FIG. 5 is not advantageous for uniform lighting of a planar surface due to excessive suppression of nadir intensity, which will manifest as a dark spot on the illuminated surface. Many lighting designers will find that Illuminance at nadir is simply too low to achieve desirable illumination uniformity in many applications.

Figure 6A:
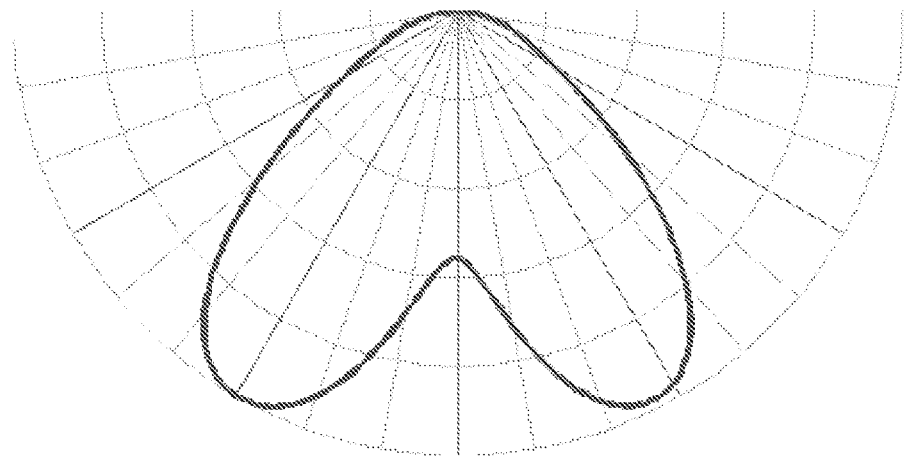
FIG. 6A is a chart illustrating the light distribution of a Lambertian light source after passing first through a linear prism film and then through a 30 degree FWHM diffuser.
Figure 6B:
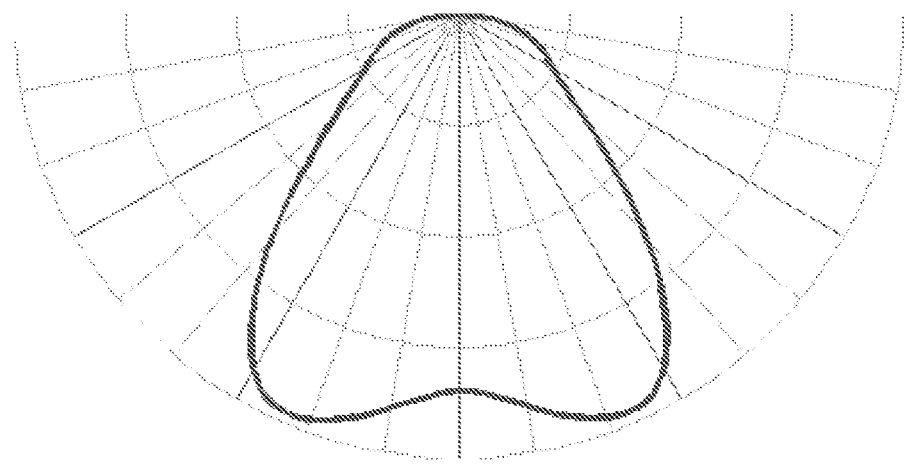
FIG. 6B is a chart illustrating the light distribution of a Lambertian light source after passing first through a linear prism film and then through a 55 degree FWHM diffuser.

To achieve a desirable 1D batwing distribution from a 90-degree linear prism, extra diffusion of the light is usually needed due to over-suppression of the nadir with linear prisms alone. FIGS. 6A and 6B plot the measured light intensity distributions at phi=90 degrees, perpendicular to the prism orientation, of a luminaire employing a prism film followed by an additional diffuser layer, with gentle and strong diffusing strength respectively. In the phi=0 degree plane, parallel to the prism orientation, these distributions are not batwing; they are approximately Lambertian, and thus the distribution is a 1D batwing distribution. The data suggest that an added diffuser modifies the 1D batwing distribution from a prism film and the outcome is much more suitable for general lighting applications than prism films alone.

Many 1D and 2D batwing distributions exist in the art.

Batwing distributions are known in the art, and are usually created using specific focusing optics (e.g. lenses and/or reflectors), and/or specific features in the geometry of a light source, such as lamp placement, and placement of internal or external baffles, louvers, openings, and placement of ordinary diffusers. Examples include US Patent Application Publication 20050201103 A1, US Patent Application Publication 20130044476 A1, U.S. Pat. No. 4,218,727 A, U.S. Pat. No. 5,105,345 A, U.S. Pat. No. 6,698,908 B2, U.S. Pat. No. 3,329,812, EP Publication 1925878 A1, U.S. Pat. No. 3,725,697, U.S. Pat. No. 7,273,299, U.S. Pat. No. 5,149,191, EP Publication 2112426 A2. In many cases the focusing optics, baffles, etc., increase the cost of a luminaire. These designs are generally strongly dependent on the placement of the light source, and generally require alignment of the reflectors, baffles, etc. with the light source. Designing these luminaires with 1D or 2D circular or rectangular batwing distributions is generally difficult and slow, requiring either advanced computer modeling or trial-and-error testing, which can be too costly for some smaller lighting manufacturers. In particular, rectangular and square batwing distributions are the most difficult to create, due to the lack of a radial symmetry.

In U.S. Pat. No. 3,721,818, Stahlhut describes an article capable of controlling light distributions, such as reducing glare and creating 1D and 2D batwing distributions. The article involves shaped surfaces on one or both sides of a substrate, with additional "light reducing areas" (e.g. paint) which can be opaque, reflective or absorbing. Undesirably, the need for these light reducing areas may both increase cost and decrease efficiency of the light fixture. In some embodiments, the need to create structures on both sides of the surface that are aligned to each other may also add expense and complexity.

In U.S. Pat. No. 3,866,036, Taltavull describes a prism-like structure including prisms or linear lenses with truncated tips upon which thick opaque structures are formed. These may create effective batwing light distributions but may be expensive and difficult to create, and the opaque structures may incur additional losses of light, reducing overall fixture efficiency.

In addition, the lack of diffusion in these structures means that from certain viewing angles, the light source(s) may be visible as undesirable bright spots on the surface of the luminaire.

In U.S. Pat. No. 3,978,332, Taltavull describes a ring-shaped structure including concentric prisms or linear lenses with truncated tips upon which are created opaque structures. These can create effective 2D batwing light distributions but may be expensive and difficult to create, and the opaque structures may incur additional losses of light, reducing overall fixture efficiency. Taltavull additionally uses the exact placement of lenses and a carefully designed reflector, all of which elements together combine to create the desired 2D batwing light distribution, which may add further expense.

In U.S. Pat. No. 4,161,015, Dey et. al., describe a luminaire with batwing distribution created by selective reflectivity from a multilayer interference filter with reflectivity and transmissivity that vary with angle of incidence. Unfortunately such an interference filter may be expensive to create, and may generally be wavelength-sensitive. In addition, when viewed from certain angles, there is undesirably no obscuring of the light sources.

In US Patent Application Publication 20090296401 A1 Gutierrez describes a system that uses a moving resonant mirror to create a desired light distribution, including batwing distribution. Such a system may suffer from excess power consumption, noise created by the mechanical motion, flicker, and possibly reliability issues associated with moving parts.

In U.S. Pat. No. 4,059,755 A, Brabson describes the use of three different prism optics in two layers to create a 1D batwing distribution. This system may undesirably need to be aligned to a linear source. Undesirably, the two layers of custom prism optics may be expensive, and may incur a reduction of efficiency associated with reflections from multiple optical interfaces.

In many other examples, including US Patent Application Publication 20090225543, US Patent Application Publication 20120275150, PCT Publication WO2012109141 A1, U.S. Pat. No. 7,658,513, US Patent Application Publication 20130042510, U.S. Pat. No. 8,339,716 B2, US Patent Application Publication 20130039090 A1, U.S. Pat. No. 7,273,299 B2, U.S. Pat. No. 7,731,395 B2, US Patent Application Publication 2009096685 A2, US Patent Application Publication 20110141734 A1, U.S. Pat. No. 7,942,559 B2, U.S. Pat. No. 7,993,036 B2, individual light sources (typically LEDs or collections of LEDs) are modified using lenses, reflectors, light pipes, or the LED package, in close proximity to light sources. Many light distributions can be created this way (as known in the art), including 1D and 2D batwing distributions. In many general lighting applications, large numbers of LEDs (typically tens or hundreds) are used over the area of the luminaire, and the use of lensed LEDs with non-Lambertian distributions can be costly. Also, individual LEDs can be piercingly bright when unobscured, even if focused using localized lenses. To achieve desirable smooth appearance of a luminaire and obscure the light sources, additional diffusers may be required, incurring higher costs. Further, such diffusers may in some cases not be able to sufficiently homogenize the surface appearance of the luminaire without degrading the distribution created by the LEDs.

In U.S. Pat. No. 2,394,992, Franck describes a luminaire with 2D elliptical batwing light distribution employing a lamp (substantially a point source) illuminating a compound lens with Fresnel-lens-like prisms on both surfaces. One surface is a radial compound Fresnel lens including a central spreading region and a peripheral focusing region to form a 2D circular batwing distribution. The other surface is a linear Fresnel lens which is the regressed optical equivalent of a negative or divergent cylindrical lens surface and provides additional spreading of the batwing distribution along one axis, transforming the circular batwing to an elliptical batwing distribution. This solution may depend on a light source that is substantially a point-source, and thus may not work with extended Lambertian sources. In addition the optic undesirably is custom designed for the luminaire (e.g. the distance from the light source and total illuminated diameter), and may need to be aligned to the light source.

In U.S. Pat. No. 5,997,156 A, Perlo et. al. describe creating rectangular or square light distributions using rippled lenticular lenses or TIR prism lenses in conjunction with a collimated light source (in the example provided, using a parabolic reflector). However, the techniques mentioned may not work with Lambertian light sources.

In U.S. Pat. No. 3,829,680, Jones describes a lighting panel with a continuous pattern of triangle projections, each triangle having three mutually perpendicular smooth faces (in today's nomenclature, such a pattern is often called "corner cube"). This lighting panel can provide a 2D batwing distribution from Lambertian light input. The distribution created by this type of structure has a hexagonal rosette pattern when viewed on a flat floor (due to having refraction through repeated flat planes at only six geometric orientations), and is a rough approximation to a 2D circular batwing distribution. In some cases, these hexagonal artifacts will be undesirable to lighting designers. In addition, due to the small number of geometric orientations of the faces, light sources are not sufficiently obscured for many lighting purposes. Jones discloses the use of a diffuser in conjunction with the corner cube sheet, which successfully obscures the light sources but incurs extra expense and loss of efficiency associated with reflections from the extra optical interfaces involved in using two separate optical elements.

In U.S. Pat. No. 586,211, Basquin describes a window composed of prisms that are designed to spread sunlight into a room. Basquin arranges the prisms in unit cells (e.g. hexagons or squares), with prisms within each unit cell having a desired orientation, the net effect of the prisms in all oriented cells having a desired effect on the light. Basquin is designed to work with sunlight, which will be recognized by those skilled in the art as a collimated light source relative to a window. Basquin does not create a 2D batwing light distribution.

In U.S. Pat. No. 4,984,144, a light fixture is provided in which a high aspect ratio fixture (such as a thin sign) is illuminated from the side, and in which prisms are used in total internal reflection (TIR) mode to direct light outside the fixture, maximizing light exiting at an angle normal to the surface of the fixture (and thus not in a batwing distribution). Because of the internal side illumination, the light source is strongly directional, and thus not Lambertian. This fixture does not produce a batwing distribution.

In U.S. Pat. No. 5,193,899, a prism is used in conjunction with a diffuser to increase the uniformity of brightness on the surface of a sign to hide "lamp images" (i.e. provide a smooth appearance on the surface of the sign) that obscures the location and visibility of the underlying lamps. Because of the strong diffusers used to make the surface of the sign highly uniform, the fixture does not emit light in a batwing distribution.

In U.S. Pat. No. 5,243,506 A, a light-pipe architecture illuminated by a single source at the end of the light pipe uses prisms to couple light out of the light pipe at a point and in a direction substantially perpendicular to the surface of the light pipe at that point. By using metal masking in selective locations to determine where light can strike the prisms and escape the light pipe, 1D light distributions including 1D batwing distributions can be sculpted.

CN 202532218 U discloses a lamp structure with batwing light intensity distribution. The lamp structure comprises at least two light-emitting diode (LED) groups, a light guide plate, a reflecting part and a prism sheet, and is characterized in that: the light guide plate is provided with a first surface and a second surface; and the first surface is provided with a micro structure. Distribution in a way that both sides are sparse while middle is dense is adopted, so that the refraction angle of light rays is changed, and the light rays are refracted out of the light guide plate. Light rays are uniformly scattered effectively through the geometric structure on the prism sheet facing the light guide plate, so that batwing light intensity distribution is achieved.

Investigation

In trying to design an optical film or plate with 2D circular batwing distribution, the present inventors considered surface features including close-packed arrays of cones, which is the 2D analog of a 1D linear prism. As mentioned earlier, it is known that when a prism optic is illuminated with Lambertian light impinging upon the smooth side (i.e., used in a brightness-enhancing orientation, rather than a batwing-generating orientation), the intensity is amplified at the nadir, while the FWHM is reduced. Analogously, when a close-packed cone array optic is illuminated by Lambertian light upon the smooth side, the intensity is amplified at the nadir, while the FWHM is reduced, as one skilled in the art would expect, and as the 1D prism-2D cone analogy would imply. Also as expected, this light distribution substantially has radial symmetry around the theta=0 axis.

Figure 7:
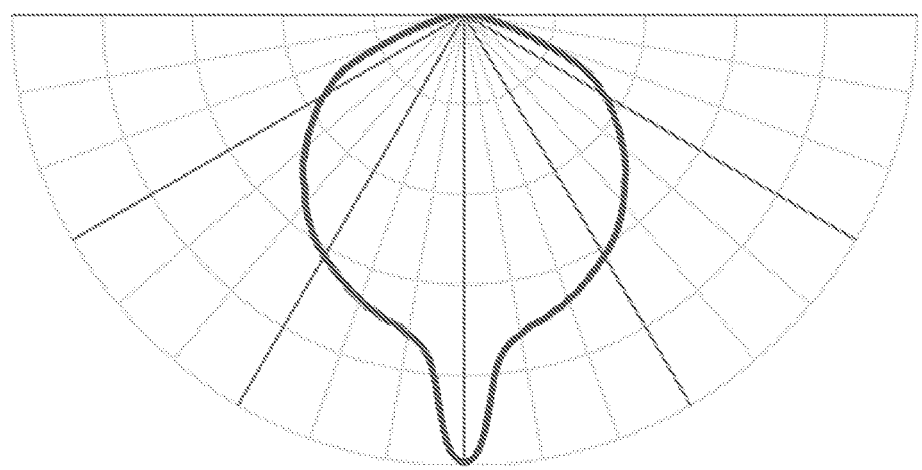
FIG. 7 is a chart illustrating the light distribution of a Lambertian light source having a FWHM of 120 degrees after passing through a film having an array of closely-packed cones facing the light source.
Figure 8:
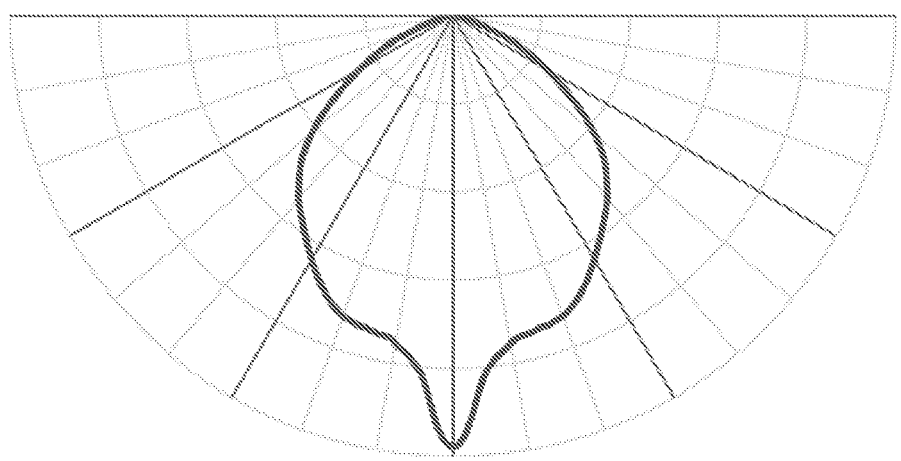
FIG. 8 is a chart illustrating the light distribution of a near-Lambertian light source having a FWHM of 80 degrees after passing through a film having an array of closely-packed cones facing the light source.
Figure 9:
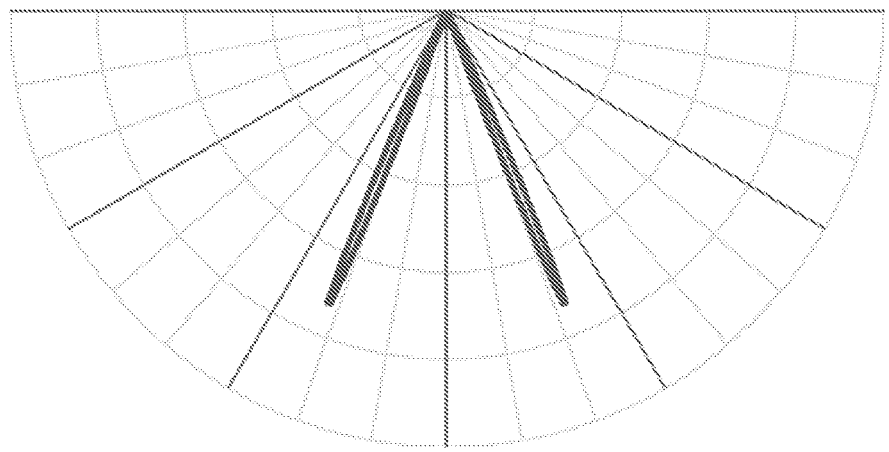
FIG. 9 is a chart illustrating the light distribution of a collimated light source after passing through a film having an array of closely-packed cones facing the light source.
Figure 10:
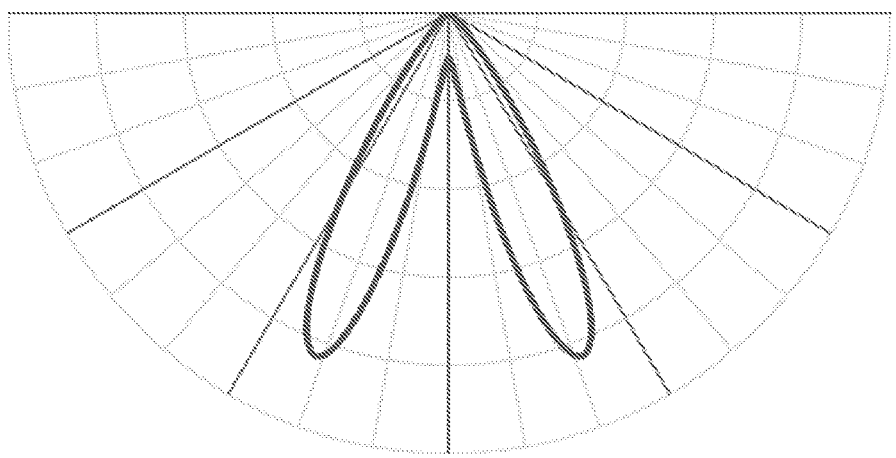
FIG. 10 is a chart illustrating the light distribution of a near-collimated light source having a FWHM of 20 degrees after passing through a film having an array of closely-packed cones facing the light source.

In the opposite orientation, as mentioned earlier, Lambertian light entering the prism side of a prism sheet (i.e., used in the batwing-generating orientation) provides an approximate 1D (linear) batwing distribution. Expecting Lambertian light entering the cone side of a cone sheet to analogously form a 2D circular batwing distribution, the present inventors tested a commercially-available sheet comprising an array of cones protruding from one side, with a smooth surface on the opposite side. The cones were arranged in a hexagonal grid on a 2 mm repeat length, with 100 degree internal angle at the tip. Surprisingly, upon testing, the cones did not create a batwing distribution at all, as shown in FIG. 7, measured using an incoming 120 degree Lambertian distribution. When measured with an 80 degree Lambertian incoming light distribution, the cones again did not create a batwing distribution, as shown in FIG. 8. The same cone array was then tested with collimated light illuminating the cone side, and as expected, created a circle of light. The slice measured at phi=0 is shown in FIG. 9, with slices measured at any other azimuthal angle substantially the same. Similarly, the same cone array was measured with a near-collimated 20-degree light into the cone side, and created the batwing-like distribution of FIG. 10. Thus a cone array can create batwing distributions for collimated and narrow near-collimated distributions, while surprisingly failing to do so for wide (Lambertian) distributions.

Additional References

In US Patent Application Publication 20120275185, Edamitsu discloses an illuminator that creates 2D batwing distributions using prisms facing the light source. In this publication, no detail is given as to the incoming light distribution produced by the light source (it is not stated whether the light source is collimated or Lambertian). However, the light distribution of the light source can be deduced from the data provided. In the embodiment of FIG. 5 of that '185 publication, it is stated that a cone array, with flat spaces in between, can produce a batwing distribution shown in FIG. 6 of the '185 publication. In consideration of the data provided on cone arrays by the present inventors, one can determine that the data of FIG. 6 of the '185 publication only makes sense if the source is substantially collimated. This is similarly true for the other embodiments in the '185 publication. The addition of and need for flat areas, as described to fill in extra light at nadir, also implies a collimated light source. Such flat areas generally are necessary in part because of the collimated light—without the flat areas, upon illumination by collimated light there would be substantially no illumination at nadir, providing insufficient illumination at nadir to evenly illuminate a flat surface. Substantial flat areas are disadvantageous when used with Lambertian light sources, however, because too much Lambertian light is passed through said flat areas, reducing or preventing batwing distributions from being formed. In addition, flat areas in a lighting optic are particularly disadvantageous because they allow a direct view of the light sources (lamps), whereas hiding or obscuring lamps in lighting is generally preferred.

Similar to the '185 publication, US Patent Application Publication 20130070478, Edamitsu discloses an approximate cone including a hexagonal prism, interspersed with triangular corner-cube elements. As in the '185 publication, the '478 publication does not disclose the light distribution of the light source used in testing, but it can be deduced to be substantially collimated following the same argument above. This approximate cone can be reasonably expected by one skilled in the art to have performance similar to a cone, which as shown by the present inventors' data above has limitations on its ability to form batwing distributions from Lambertian light. In addition, the complex structure is difficult to manufacture, generally requiring precision diamond cutting of a master form or tool. As with Jones' U.S. Pat. No. 3,829,680, discussed above, the '489 publication describes planar surfaces oriented in only six directions. Due to this small number of geometric orientations of the faces, light sources are not sufficiently obscured for many lighting purposes.

Although in some cases the patterns of Edamitsu's '185 and '478 publications, and Jones' 680 patent may achieve 2D batwing distribution that are acceptable to some lighting designers and specifiers, the patterns of various embodiments described herein may be particularly advantageous due to their ability to work with Lambertian sources, increased obscuration of light sources, ease of manufacture, smoothness of light distribution, flexibility and controllability of the light distribution and its shape (such as making square or rectangular distributions), and/or capability of creating visually pleasing surface patterns.

In U.S. Pat. No. 7,660,039, Santoro et al. disclose kinoform diffusers that (a) reduce luminance at high viewing angles (known as glare), and/or (b) when disposed on either side of transparent or curved "centrally located regions" directly beneath light sources produces a 1D or 2D batwing luminous intensity distribution. Undesirably, this "centrally located region" appears to be required to form a batwing distribution. Of the embodiments employing a contiguous or monolithic diffuser (and thus having no curved or transparent "centrally located region"), none provide a batwing luminous distribution (although many of them reduce glare). When a "centrally located region" is included and located directly below the light source as taught, then rays emitted downward and near-downward by the light source toward said region do not strike the kinoform diffuser, which is located at the sides. Thus the kinoform diffuser itself is not creating a batwing distribution from a Lambertian light source. Rather two spatially-separated kinoform diffusers (neither of which is directly beneath the light source) cooperate to create a batwing distribution (creating one half of the distribution each) from collections of rays that are directional (each having a strong sideways component) and contain substantially no directly-downward component to their direction, and thus are not Lambertian. The need for a "centrally located region" may increase expense, and, in the embodiments for which said region is transparent, there is undesirably no obscuration or hiding of the lamps. Additionally, the diffuser may need to include multiple light scattering elements, "on each of which are one or more sub-elements." In practice these sub-elements may be very difficult to create and control. Advantageously, various embodiments described herein do not require kinoform or holographic diffusers, do not require such sub-elements, and can be used in contiguous spans without the need for transparent or curved "centrally located regions."

In U.S. Pat. No. 7,837,361, Santoro et al. disclose a light control device implemented with a diffuser that creates batwing light intensity distributions. As with the Santoro '039 patent, a "centrally located region" appears to be required to form a batwing distribution, resulting in the same disadvantages explained above for the '039 patent.

In U.S. Pat. No. 8,047,673, Santoro describes a light control device implemented with multiple diffusers. The light control devices and luminaires disclosed create 1D batwing light distributions by means of a central lamp, multiple diffusers, and openings with carefully designed placement. As described above, the placement of the diffusers separated by a central element means that each diffuser receives light from a non-Lambertian collection of rays and does not create a batwing light distribution from a Lambertian light distribution. The luminaire described does create 1D batwing distributions, but does so using the diffusers, lamp, openings, and internal reflections working collectively, and thus is distinct from various embodiments described herein, which can create 2D batwing distributions from Lambertian light.

Potential Advantages

Various embodiments described herein can provide a 2D batwing diffuser that can form light into useful 2D batwing distributions, including but not limited to elliptical, circular, rectangular, and square distributions.

Various embodiments described herein can provide a 2D batwing diffuser that can, when used in a luminaire, provide substantially uniform illumination over a flat surface of a defined shape, including but not limited to elliptical, circular, rectangular, and square shapes.

Various embodiments described herein can provide a 2D batwing diffuser that can form light from Lambertian-distributed sources, including LED point sources and LED arrays, into useful 2D batwing or flat-field distributions.

Various embodiments described herein can provide a 2D batwing diffuser that can form light from approximately-Lambertian sources into useful 2D batwing or flat-field distributions.

Various embodiments described herein can provide a 2D batwing diffuser that can form light from substantially collimated or near-collimated sources into useful 2D batwing or flat-field distributions.

Various embodiments described herein can provide a contiguous or monolithic 2D batwing diffuser that can form 2D batwing distributions without requiring cooperation from other light emitting region(s) such as a centrally located transparent region.

Various embodiments described herein can provide a 2D batwing diffuser optic for a luminaire that does not require specific alignment relative to the luminaire's light sources.

Various embodiments described herein can provide a 2D batwing diffuser that is shift-invariant, and thus can be manufactured in large areas such that a diffuser suitable for a given luminaire can be cut from an arbitrary location of the large area without the need to align the cut to specific optical features (such as a central point) of the optical structure.

Various embodiments described herein can provide a 2D batwing diffuser with high optical transmission, having substantially no light-absorbing materials.

Various embodiments described herein can provide a 2D batwing diffuser that obscures or helps obscure light sources, including but not limited to LEDs and fluorescent lamps.

Various embodiments described herein can provide a 2D batwing diffuser that increases the luminance uniformity on the surface of a luminaire.

Various embodiments described herein can provide a 2D batwing diffuser that has a visible surface pattern that may be aesthetically pleasing to a viewer. Further, various embodiments described herein can provide a 2D batwing diffuser optic that has a visible surface pattern that visually obscures light sources such as LEDs, or distracts the eye to reduce their visibility.

Various embodiments described herein can provide a 2D batwing diffuser than can be efficiently and inexpensively mass-produced in areas large enough to be suitable for use in general lighting.

Various embodiments described herein can provide a 2D batwing diffuser that reduces luminance at high viewing angles relative to a Lambertian source.

Various embodiments described herein can provide a substantially flat or slightly curved 2D batwing diffuser optic that can form light into useful 2D batwing distributions.

Various embodiments described herein can provide 2D batwing diffuser that when used with an appropriately configured specular reflector will create a one-sided distribution suitable for applications including wall-wash and/or cove lighting.

Various embodiments described herein can provide a luminaire employing a 2D batwing diffuser, the luminaire emitting light into a 2D batwing distribution.

Various embodiments described herein can provide a luminaire employing a 2D batwing diffuser optic, the luminaire emitting light into a one-sided distribution suitable for wall-wash and/or cove lighting applications.

General Description

Various embodiments described herein can provide a 2D batwing diffuser comprising a substrate having a first and second surface, the first surface having pattern elements comprising a plurality of substantially parallel, approximately linear prismatic microstructures, or prisms, said prisms having multiple orientations within the array, configured to modify the light distribution of a typical artificial light source into a 2D batwing distribution. The prisms are substantially isosceles triangular in cross-section, and may include other features such as a rounded tip and/or valley, or surface roughness. In many embodiments, the prisms are curved, and in many embodiments, some or most of the prisms form closed, concentric geometric shapes.

Various embodiments described herein are based on the insight, after the surprising failure of cone array optics to form batwing distributions, that arrays of parallel prisms having the indicated characteristics can form 2D batwing distributions from Lambertian light. In many embodiments disclosed herein, the 2D batwing diffuser does not require alignment to the light source, and can be manufactured in large areas, with parts cut to size in substantially any layout.

Detailed Description of Embodiments

Figure 11:
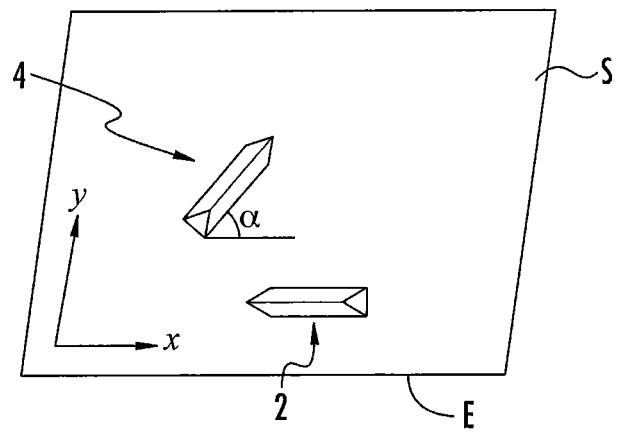
FIG. 11 is a perspective view of a substrate having prisms oriented thereon in different prism orientation angles.

Prism-like structures can be arranged on a substrate S as illustrated in FIG. 11. The prisms are created on the surface of a substrate that defines the x-y axis, and thus the line defined by their peak is always parallel to the x-y plane as defined in the figure. We choose to define the orientation of a prism to be in the x-y plane and parallel to the line making the crest of the prism. The prism orientation angle is the angle measured in the plane from the x axis, counter-clockwise to the prism axis. The prism orientation angle may be measured relative to an edge E of the substrate S. The prism 2 has a prism orientation angle of roughly 0 degrees from the x-axis, while the prism 4 has a prism orientation angle $\alpha$ of roughly 45 degrees from the x-axis. For a symmetrical prism, a prism orientation angle of 180 degrees is indistinguishable from a prism orientation angle of 0 degrees.

Figure 12:
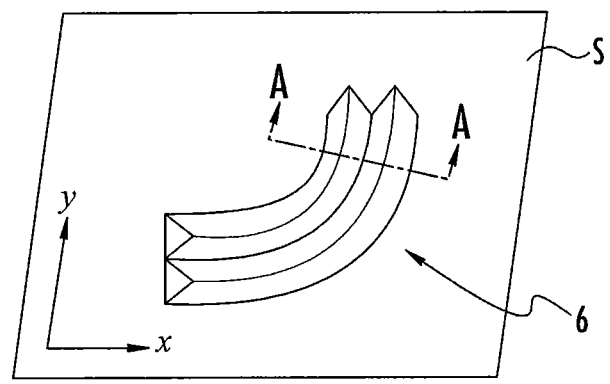
FIG. 12 includes a perspective view of a substrate having curved prisms oriented thereon and a cross-sectional view of the prisms.
Figure 12:
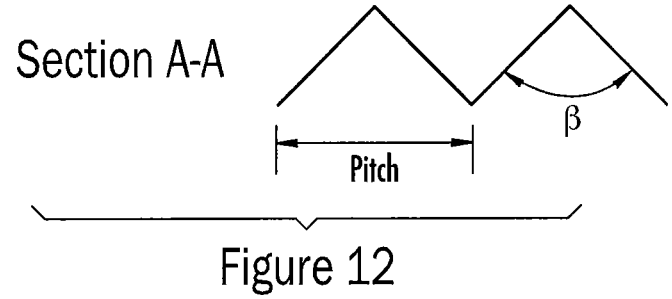

In FIG. 12, a curved prism 6 is presented. The peak of the prism forms a curved line that, once again, is substantially parallel to the plane of the substrate S (the x-y plane). This prism does not have one orientation angle, but has a continuum of orientation angles ranging from 0 to 90 degrees. This curved prism can be approximated as the combination of several shorter, substantially straight sub-prisms, each at its own prism orientation angle. Similarly, a curved prism that made a complete circle would represent all prism orientation angles in equal measure. Section A-A shows a cross section upon which two features are defined, (i) the prism pitch being the distance between the valleys on either side of a prism peak, and (ii) the prism internal angle $\beta$, being the full angle subtended by the prism peak.

Figure 13:
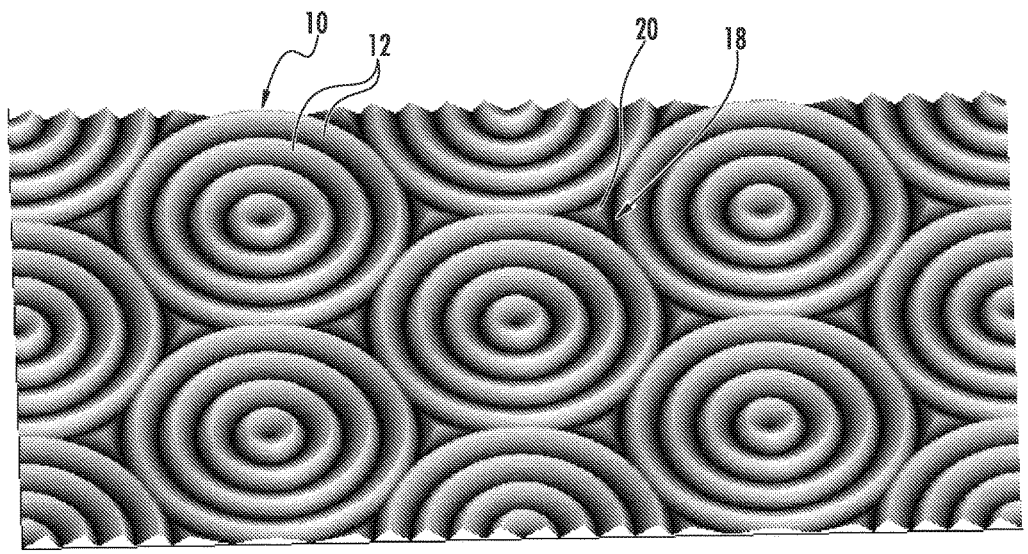
FIG. 13 is an enlarged fragmentary perspective view of a light transmissive structure including an array of microprism elements according to some embodiments described herein.

In some embodiments, a 2D batwing diffuser includes prisms arranged in pattern elements 10 having a plurality of concentric circles, as shown in FIG. 13, said circles of concentric and substantially parallel prisms 12 arrayed upon the substrate in a desired pattern, such as close-packed hexagons.

Figure 14:
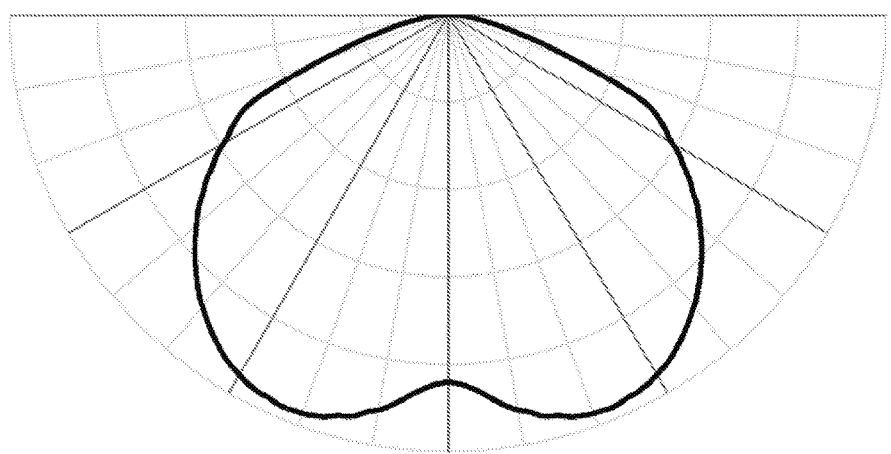
FIG. 14 is a chart illustrating the light distribution of a Lambertian light source having a FWHM of 120 degrees after passing through the light transmissive structure of FIG. 13 with the microprism elements facing the light source.
Figure 15:
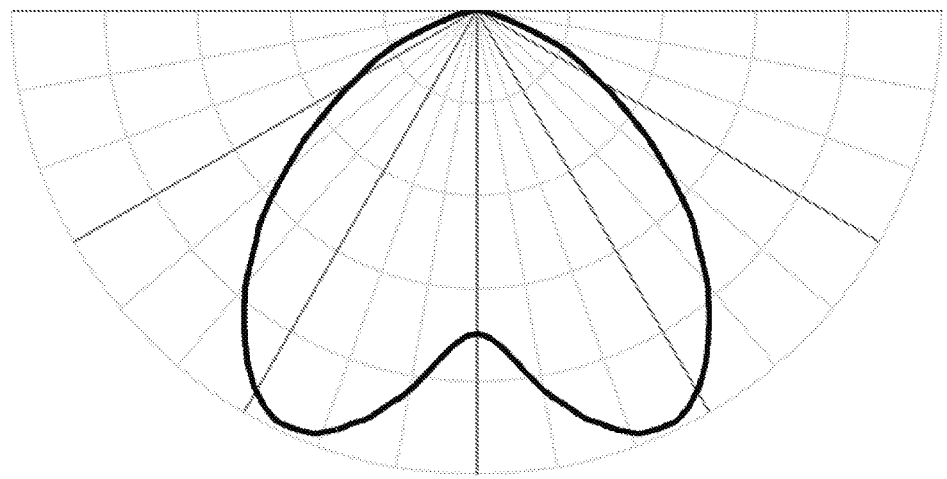
FIG. 15 is a chart illustrating the light distribution of a light source having a FWHM of 40 degrees after passing through the light transmissive structure of FIG. 13 with the microprism elements facing the light source and having microprisms with a prism internal angle of about 90 degrees.

In one particular example of the embodiment above, the prisms have 60 micron pitch, and are repeated in a hexagonal array with dimension 250 um to fill the surface of the diffuser. The prism internal angle is about 90 degrees, and the refractive index is 1.49. When illuminated with 120 degree Lambertian light, this 2D batwing diffuser produces an approximately radially-symmetric 2D batwing light distribution, as shown in FIG. 14. When illuminated with 40-degree Lambertian light, this 2D batwing diffuser produces an approximately radially-symmetric 2D batwing light distribution that is narrower and has a greater degree of nadir suppression, as shown in FIG. 15.

Figure 16:
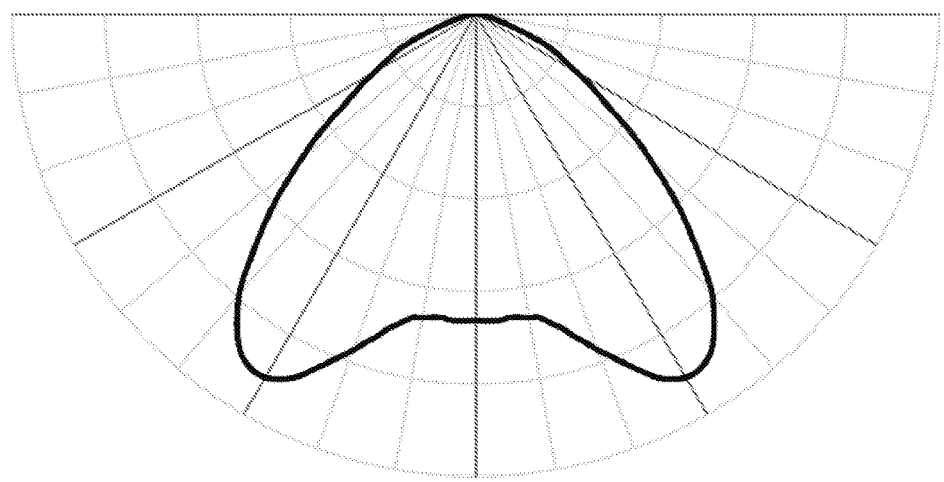
FIG. 16 is a chart illustrating the light distribution of a light source having a FWHM of 40 degrees after passing through the light transmissive structure of FIG. 13 with the microprism elements facing the light source and having microprisms with a prism internal angle of about 70 degrees.

In an additional embodiment, the substantially parallel prisms are arranged in concentric circles and have 60 micron pitch in pattern elements that are repeated in a hexagonal array with dimension 2.5 mm to fill the surface of the diffuser. The prism internal angle is substantially 70 degrees, and the refractive index is 1.49. When illuminated with 40-degree Lambertian light, this 2D batwing diffuser produces an approximately radially-symmetric 2D batwing light distribution shown in FIG. 16.

In an additional embodiment, a 2D batwing diffuser is created using prisms arranged in a concentric circle pattern. The prisms have a pitch of 60 microns and repeated in a hexagonal array with dimension 4 millimeters, creating a 2D circular batwing light distribution when illuminated upon the prism side by Lambertian light. One unexpected benefit is that the hexagons are visible to the naked eye, and the array of hexagonal elements produces a pleasing surface pattern that adds artistic and visual appeal.

The geometric arrangement of prisms and the prisms' internal angles can be changed in a multitude of ways to customize the light distribution created by a light source.

Figure 17:
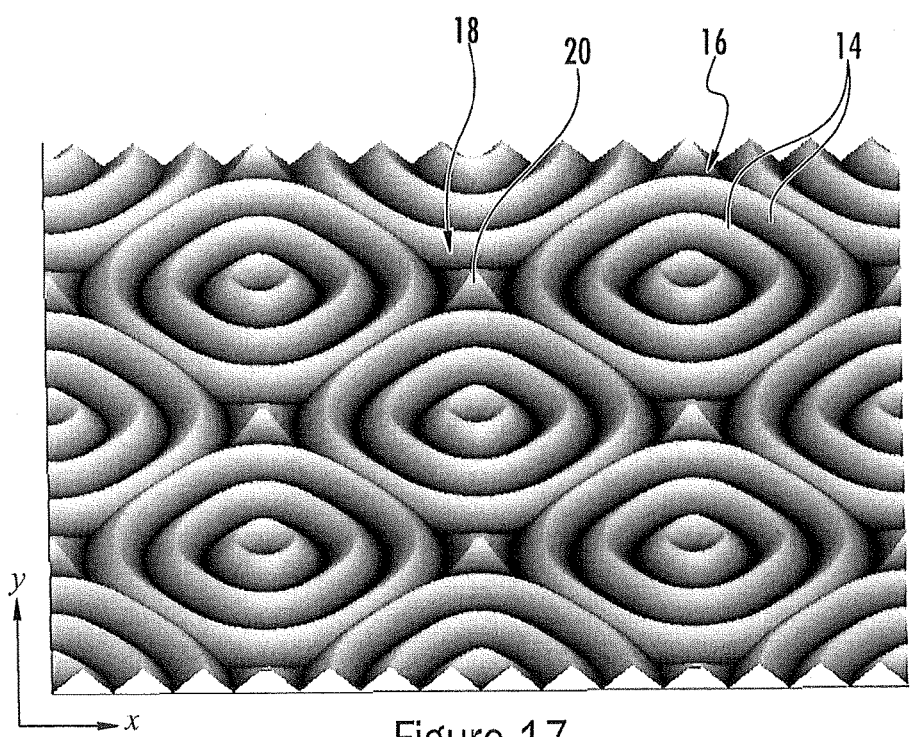
FIG. 17 is an enlarged fragmentary perspective view of a light transmissive structure including an array of microprism elements according to some embodiments described herein.

In the embodiment of FIG. 17, the prisms 14 take the shape of a squared-off circle (examples include but are not limited to the geometric shapes known as squircle and superellipse), arrayed substantially parallel to one another in concentric diamond-shaped (i.e. 45-degree tilted square) pattern elements 16. As depicted in FIG. 17, there exists a greater area on the substrate covered by prisms oriented near 45 and 135 degrees, and a reduced area on the substrate covered by prisms oriented near 0 and 90 degrees relative to the x axis indicated in the figure. In this embodiment, in any representative area comprising several elements, all prism orientation angles are represented, with prism orientation angles near 45 and 135 degrees being represented by more area on the substrate than prisms near 0 and 90 degrees. When illuminated by Lambertian illumination, this diffuser will produce a 2D batwing light distribution that is somewhat square, and brighter near 45 and 135 degrees and less bright near 0 and 90 degrees.

Figure 18:
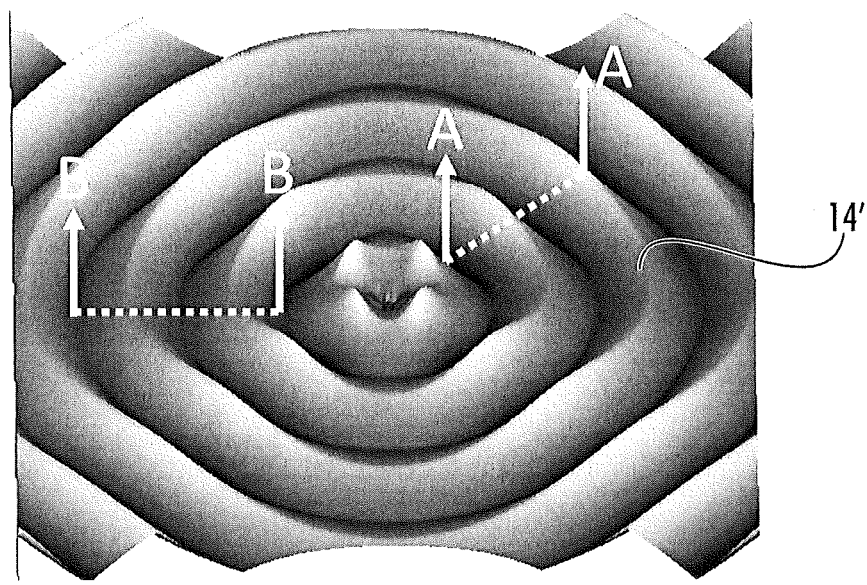
FIG. 18 includes an enlarged fragmentary perspective view of one of the microprism elements of FIG. 17 modified to have microprisms having a prism internal angle that varies as a function of prism orientation angle and cross-sectional views of the prisms.
Figure 18:
Figure 18:
Figure 19A:
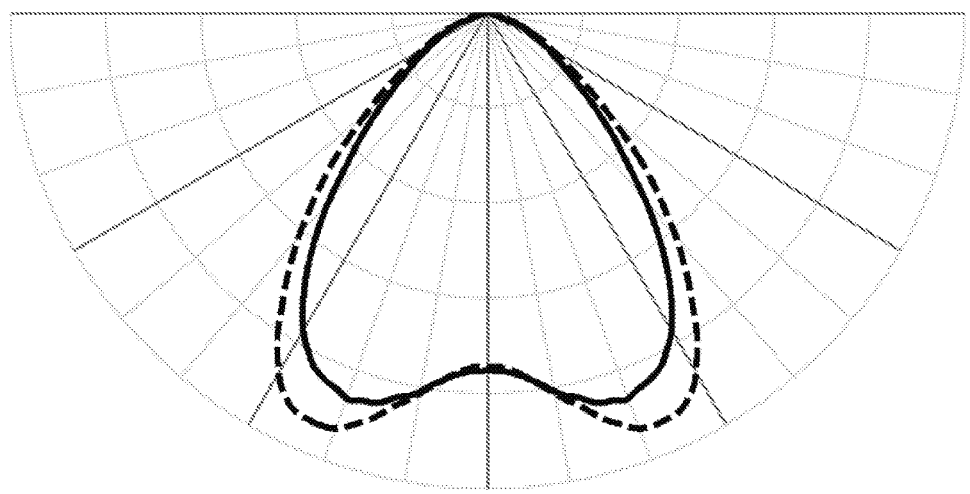
FIG. 19A is a chart illustrating the light distribution of a light source having a FWHM of 40 degrees after passing through the light transmissive structure of FIG. 18 with the microprism elements facing the light source.
Figure 19B:
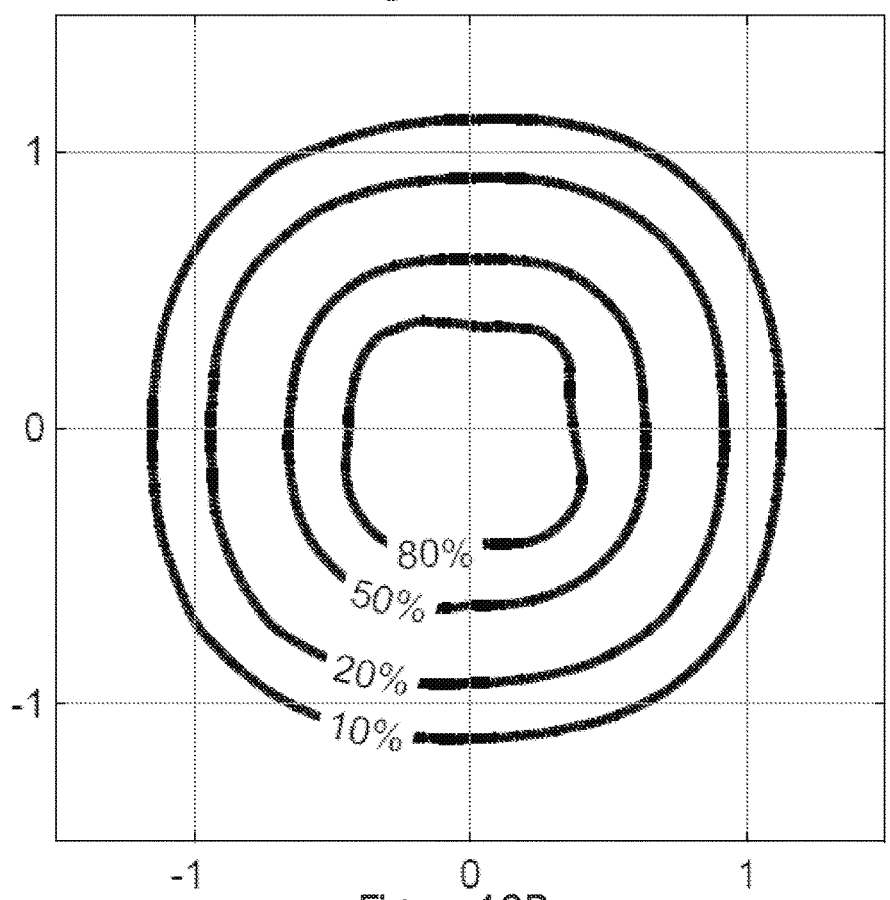
FIG. 19B is a contour plot of the illumination on a flat surface caused by the light distribution of FIG. 19A.
Figure 20:
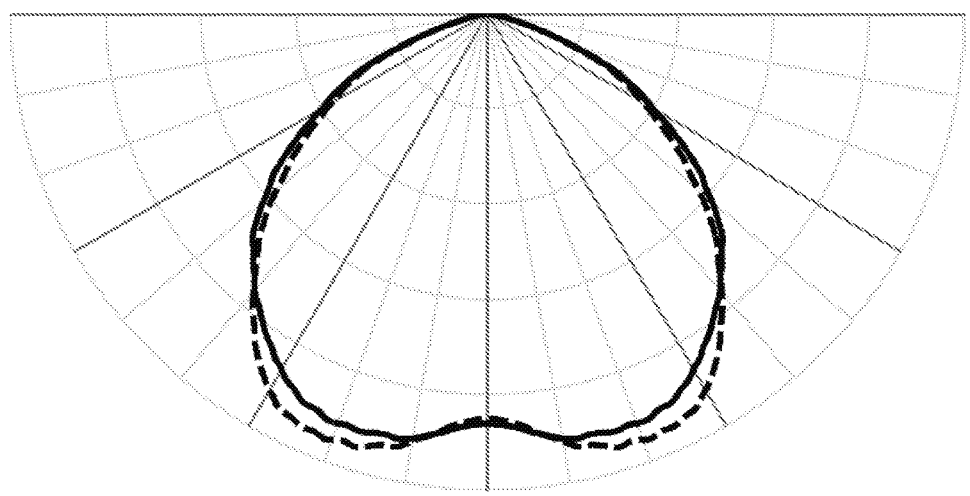
FIG. 20 is a chart illustrating the light distribution of a light source having a FWHM of 80 degrees after passing through the light transmissive structure of FIG. 18 with the microprism elements facing the light source.

In the embodiment of FIG. 18, the prisms of FIG. 17 have been further modified to create a substantially 2D square batwing distribution. In addition to the same somewhat-square footprint of the embodiment of FIG. 17, the prisms' 14' internal angle is varied as a function of the prism orientation angle. As indicated in the figure, the prisms that are oriented near 45 degrees (indicated by Section A-A) and 135 degrees have a smaller internal angle $\beta$ than the prisms oriented near 0 degrees (indicated by Section B-B) and 90 degrees. The smaller prism angle results in steeper prism sidewalls, giving a wider light distribution along the 45 and 135 degree orientations. This wider distribution coupled with the higher light intensity created by the relatively higher proportion of the substrate area covered by prisms with orientation near 45 and 135 degrees leads to a light distribution that provides enhanced brightness uniformity on flat surfaces over an approximately square area. When illuminated by a 40 degree Lambertian source, this diffuser produces the light distribution shown in FIG. 19A. In FIG. 19A the solid line represents the light distribution measured with an angle phi=0, while the dashed line represents the light distribution measured at angle phi=45 degrees, along the diagonal of the square. As expected for a square-like distribution, the distribution is wider at phi=45 degrees than at phi=0 degrees. FIG. 19B is a contour plot of the illumination on a flat surface caused by this light distribution, and the square nature of the illumination pattern can be seen. The scale on the horizontal (x) and vertical (y) axes is the offset on a flat surface such as a floor relative to the mounting height of the luminaire over the floor. Thus for a luminaire 10 feet above a floor, the points at x=1 on the plot represent a distance measured 10 feet away from nadir in the x direction. When illuminated by an 80-degree Lambertian source, the 2D batwing diffuser of the embodiment of FIG. 18 produces the light distribution shown in FIG. 20.

In another embodiment (not pictured), elongation of the square prisms of the embodiment of FIG. 18 into a (non-square) rounded rhombus-like shape, with appropriate changes to the prism curvatures and internal angle modulation results in a light distribution with uniform illumination over a rectangular (rather than square) area.

In another embodiment (not pictured), modification of the circular prisms of the embodiment of FIG. 13 into an (non-circular) ellipse, with the addition of appropriate internal angle modulation will result in a light distribution with uniform illumination over an elliptical (rather than circular) area.

In another embodiment, the concentric circular prisms of FIG. 13 are packed in a diamond- or square-shaped elements, similar to the shape of the elements 16 of FIG. 17.

In some embodiments, gaps may be present between at least some of the microprism elements and gap-filling microstructures may be in at least some of the gaps. See, for example, the gaps 18 and gap-filling microstructures 20 in FIGS. 13 and 17.

In many embodiments, periodic or non-periodic tilings (or tessilations) are used to arrange elements comprising concentric prisms. In some embodiments, the tiling may involve multiple tile shapes, such as in the case of penrose tiling. In all cases, the light distribution achieved by a given luminaire employing a 2D batwing diffuser will be the sum of the light distributions created by each of the elements comprising the entire 2D batwing diffuser of that luminaire.

Figure 21:
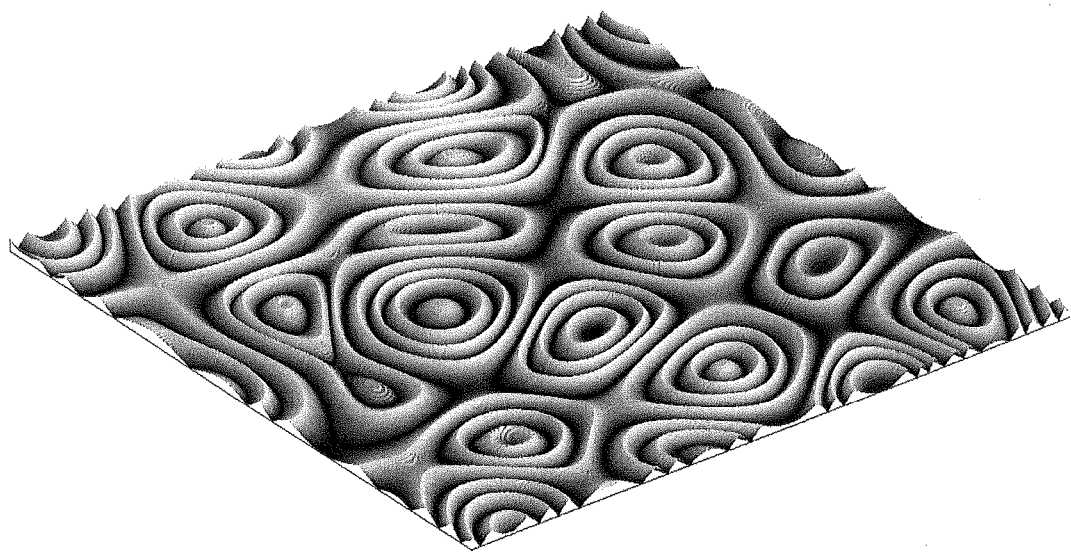
FIG. 21 is an enlarged fragmentary perspective view of a light transmissive structure according to some embodiments described herein.

In some embodiments, tiling is not used at all. In the embodiment of FIG. 21, a 2D batwing diffuser comprises prisms made with random shape and having variation in internal angle. A shape such as this can be generated mathematically in many ways, for example by mathematically generating a random bumpy data surface, and forming prisms along contour lines representing the height of the data surface. Because this random 2D batwing diffuser still comprises prisms at all orientation angles and in equal measure, this diffuser will create a 2D batwing light distribution. This embodiment may offer advantages in surface appearance and reducing the visibility (better scrambling) of the light sources to a viewer of the luminaire.

The characteristic size of pattern elements for a tiled arrangement of pattern elements can be defined as the distance between each tile, or average distance between nearest-neighbor tiles in the case of non-periodic or irregular tilings.

Although it may be difficult to clearly define individual elements in the embodiment of FIG. 21, the collection of concentric shapes could be called "pseudo-elements" and still can be said to have a characteristic size. The prism array shown has several locations that are relative maxima or minima, having the maxima or minima of the random bumps involved in generating the data surface as explained above. The characteristic size of the pseudo-elements is simply the average distance between these maxima or minima of the data surface, which can be determined by one skilled in the art through techniques such as Fourier analysis. Thus the features in the embodiment of FIG. 21 can still be said to have a defined characteristic size.

Figure 22:
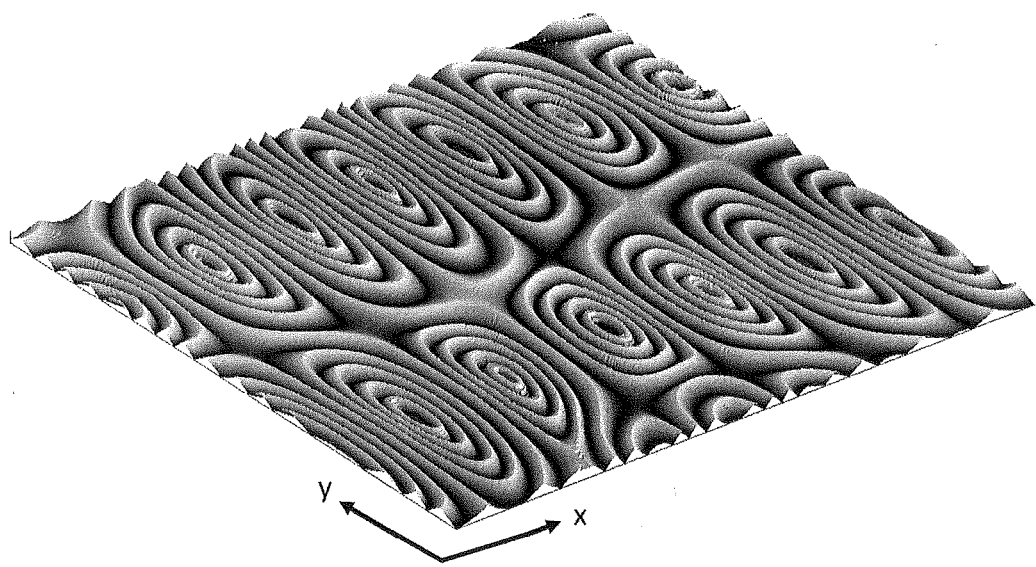
FIG. 22 is an enlarged fragmentary perspective view of a light transmissive structure according to some embodiments described herein.

In another embodiment, the 2D batwing diffuser of FIG. 22 is created in a similar manner to the embodiment of FIG. 21, further modifying the shape to be asymmetric, having prisms that are on average longer along one dimension than along the perpendicular dimension. This diffuser will have an elongated distribution due to the increased concentration of prisms with orientation near y axis compared to the concentration of prisms oriented near the x axis.

In another embodiment (not pictured), the 2D batwing diffuser of FIG. 22 is further modified to have prism internal angles which are modified from one location to another, to more effectively create an elongated light distribution.

Random distributions such in the above embodiments can be made to create square, rectangular, circular, or elliptical 2D batwing distributions through combinations of geometric shape, local changes in internal angle, etc.

Sizes for Prisms and Elements

The characteristic size of the pattern elements (which, for example, in the case of close-packed hexagons is the spacing between hexagons) will affect various embodiments described herein as follows: If the characteristic size is very small (smaller than about 1 mm) it will be undetectable by the naked eye of an observer, and the surface of the diffuser will have a smooth appearance, which is desirable in some cases. If the characteristic size is larger than about 1 mm, it will present a visible pattern to the observer.

According to laboratory experiments by the applicants, pattern elements with characteristic sizes large enough to produce visible patterns produce an unexpectedly pleasing visual appearance, adding aesthetic appeal to a luminaire in which it is used. An additional unexpected benefit of characteristic sizes large enough to produce visible patterns is that in laboratory observations, they were found to confuse the eye, giving the illusion of better hiding or scrambling of images of light sources. Such visible surface patterns are particularly effective with LEDs, in scrambling light into pleasing patterns, and in the case where additional diffusion is used, increase the effectiveness of diffusers in hiding the LEDs. In some cases involving luminaires with arrays of LEDs, it may be desirable that the pattern elements be on a similar size scale to the spacing between LEDs, in which case they provide the strongest scrambling or obfuscation of the visibility of LED sources.

If the characteristic size of the pattern elements is more than an order of magnitude and in some embodiments, more than two orders of magnitude, and in some other embodiments, at least four orders of magnitude smaller than the light exit surface of the luminaire, then the diffuser's response to light will be substantially uniform over dimensions comparable to said light exit surface of the luminaire. As such, the light distribution created by the luminaire will not be sensitive to the exact placement of the diffuser in the luminaire. This is potentially advantageous for allowing tolerance in the assembly of the luminaire, and additionally potentially advantageous in allowing the product to be manufactured in sheets with large surface areas, from which 2D batwing diffusers can be cut from any location on the sheet without needing to align the cut to specific features on the 2D batwing diffuser pattern, saving cost. Thus in many cases it may be particularly advantageous that the characteristic size of pattern elements is more than an order of magnitude smaller, and in some embodiments more than two orders of magnitude smaller, and in some other embodiments at least four orders of magnitude smaller than the light exit surface of the luminaire in which it is employed. A typical small size for the light exit surface of a luminaire is about 50 mm circular, and a typical large size for the light exit surface of a luminaire is about a 1200 mm×600 mm rectangle.

Figure 23:
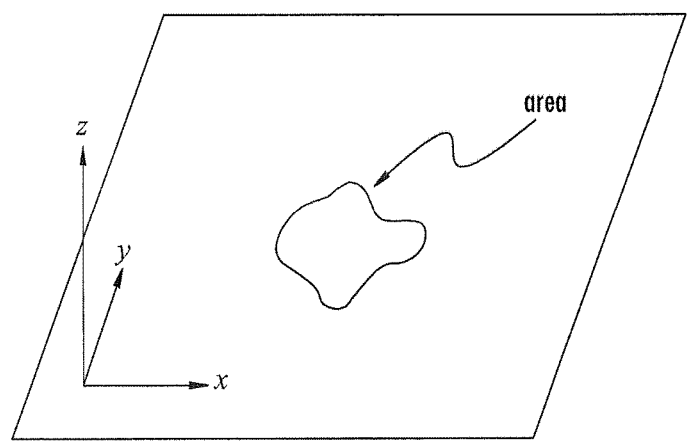
FIG. 23 is a perspective view of a light transmissive structure and a pattern element having an area thereon.

In many of the embodiments, the characteristic size of pattern elements is at least one or two or four orders of magnitude smaller than the luminaire in which it is employed. When this is true, the macroscopic optical structure is substantially uniform on the size scale of the luminaire, and to a viewer would have a consistent surface appearance, be it a smooth texture (in the case when the characteristic size is very small) or a substantially uniform pattern (for larger, more visible characteristic sizes). One can choose area on the surface of the substrate of a 2D batwing diffuser that encompasses several pattern elements, or is several times the characteristic size of pattern elements, as illustrated in FIG. 23. This area is will to contain prisms with a distribution of prism orientation angles according to the design of this particular 2D batwing diffuser, and light illuminating that area will be affected by the prisms in accordance with the prism orientation angles found in that area of the substrate. For example, if an area of the substrate contains prisms with prism orientation angles of 0 degrees and 90 degrees in equal proportion, then upon illumination the light distribution will be the sum of the light distributions created by 0 degree and 90 degree prisms, in the same proportion. If one such area contains prisms with 0 degree prism orientation angle within 75% of its area on the substrate, and prisms with 90 degree prism orientation angle within 25% of its area on the substrate, then the light distribution be the sum of the light distributions created by 0 degree and 90 degree prisms, in the same 75%/25% proportion. Now it is possible to choose a second area of similar size in a different location of the surface of the 2D batwing diffuser that contains a group of prisms with substantially the same distribution of prism orientation angles, and have substantially the same response to incoming light. By extension, it is possible to choose areas covering the entire substrate and having substantially the same distribution of prism orientation angles. Given the similarity of these chosen areas, the 2D batwing diffuser is substantially uniform over the spatial size of the substrate. For cases in which a continuous group of prism orientation angles is represented (such as a curved prism), the prisms can be represented as a sum of small straight prisms, each with a defined prism orientation angle, and the light distribution will similarly be a sum of a the light distributions created by the constituent sub-prisms. It can also be thought of as a sum of light distributions at each orientation angle in proportion to the surface area on the substrate occupied by prisms at each corresponding prism orientation angle.

Due to the preference that the characteristic size of pattern elements is significantly smaller than the size of the luminaire, and that the pattern elements are composed of a plurality of substantially parallel prisms and thus the individual prisms have a pitch that is generally smaller than the characteristic size of pattern elements, the prisms will in many embodiments be quite small, often smaller than 1 mm, and sometimes smaller than 100 microns. In these cases the individual prisms may be desirably invisible to the naked eye, while the pattern elements may be large enough to be desirably visible. However it is not strictly necessary that the prisms be this small. In some embodiments, the prisms may be visible to the naked eye. In one example embodiment, pattern elements are close hexagonally-packed regions of 50 mm size in which prisms with 2 mm pitch are arranged pattern in concentric circles, and the regions are repeated over a panel 600×1200 mm in size.

Figure 24:
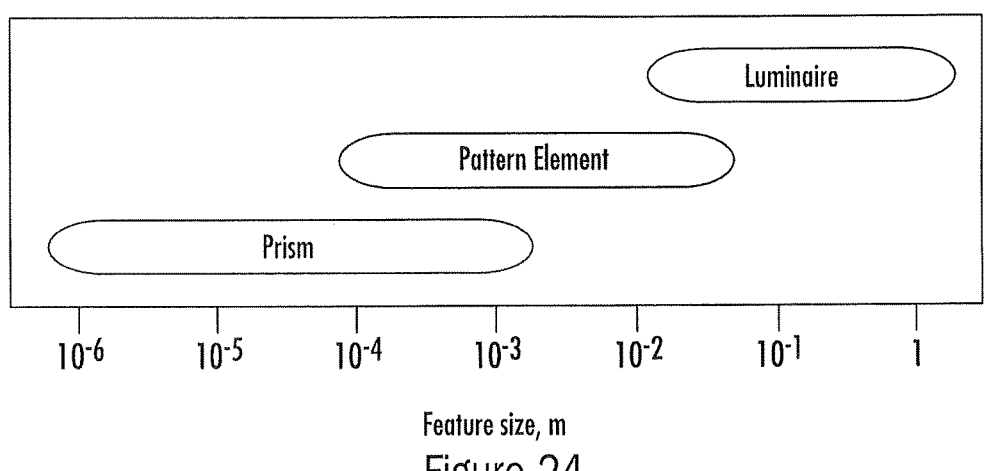
FIG. 24 is a chart illustrating the relative sizes of a luminaire, a pattern element and a prism according to some embodiments described herein.

FIG. 24 shows typical order-of-magnitude sizes in meters for the prism pitch (labeled "Prism"), the characteristic size of pattern elements (labeled "Pattern Element"), and luminaires employing 2D batwing diffusers (labeled "Luminaire"). These are only typical values, and do not place upper or lower limits on the sizes of any features of the embodiments described herein.

Figure 25A:
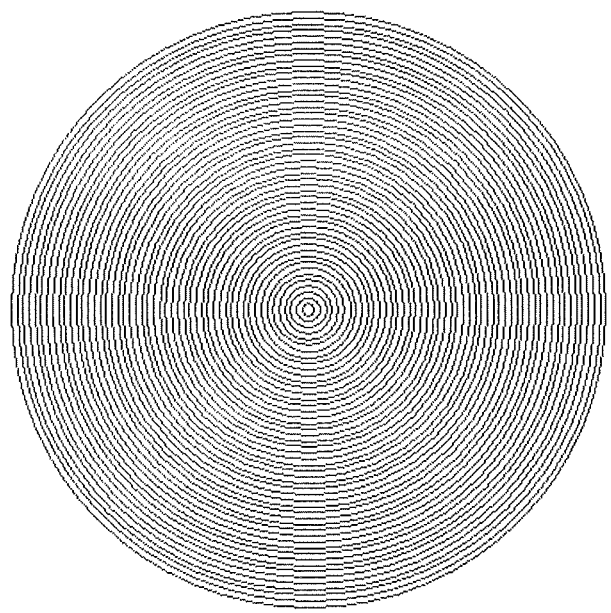
FIG. 25A is a plan view a light transmissive structure according to some embodiments described herein.

If the characteristic size of the pattern elements is approximately equal to or larger than the size of the light exit window of the luminaire, the 2D batwing diffuser will comprise substantially one pattern element. An example of a 2D batwing diffuser composed of a single element containing concentric circular prisms is shown in FIG. 25A. In laboratory experiments, the applicants have found both advantages and disadvantages to this approach.

Figure 25B:
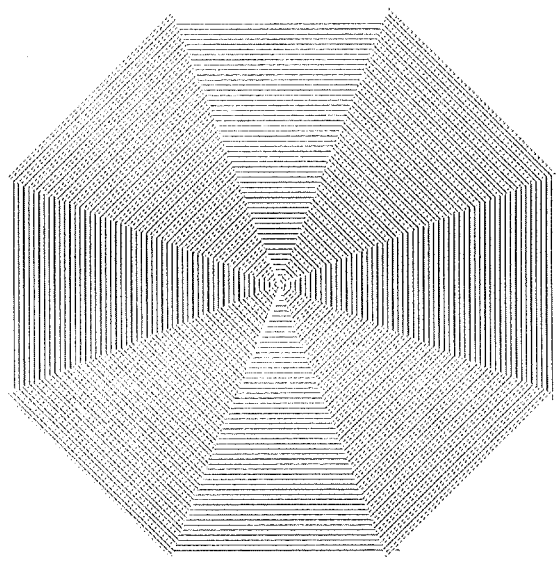
FIG. 25B is a plan view of a light transmissive structure that is an approximation of the light transmissive structure of FIG. 25A according to some embodiments described herein.

At the time of the experiments, a large 2D batwing circular prism diffuser suitable for testing on a luminaire was not available. The applicants created a multi-prism plate approximating 2D batwing circular prism diffuser by piecing together portions of a 1D linear prism film, in eight triangular "pie wedges" as shown in FIG. 25B, with the prisms being oriented substantially parallel to the circumference of the shape, as depicted by the lines in the figure. Such a diffuser would appear similar to a Fresnel lens, although it is specifically composed prisms of isosceles triangular cross-section. It does not provide focusing or imaging performance, and it does not have any vertical sidewalls, both of which are characteristic of a Fresnel lens. The size of the diffuser was approximately 12 inches in diameter, comprised of prisms with 90 degree internal angle and approximately 25 micron pitch, and it was tested on a 4-inch circular LED luminaire, the extra surface area being unnecessary, but helpful in facilitating the tests below. The prisms faced toward the light source in the testing.

Figure 26:
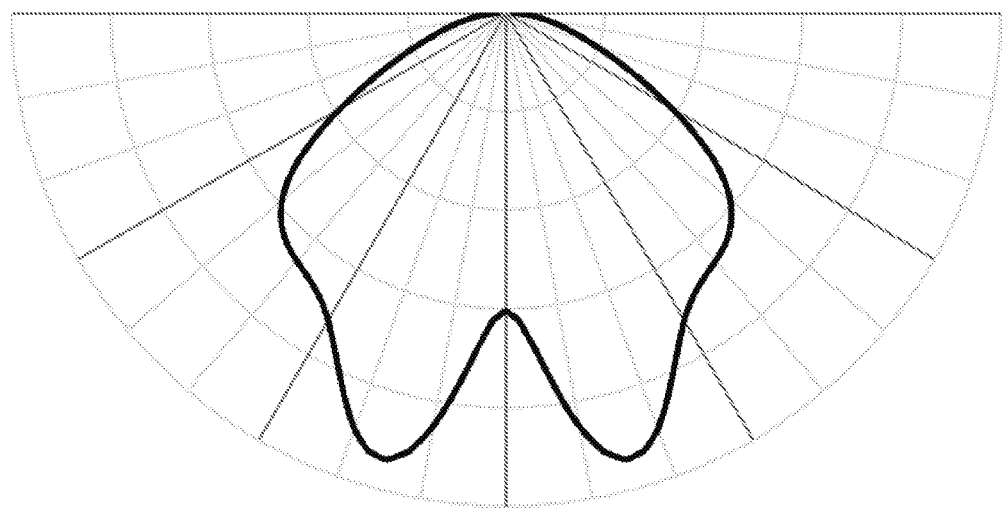
FIG. 26 is a chart illustrating the light distribution of a Lambertian light source after passing first through the light transmissive structure of FIG. 25B with the prism side facing the light source and then through a 15 degree FWHM diffuser.
Figure 27A:
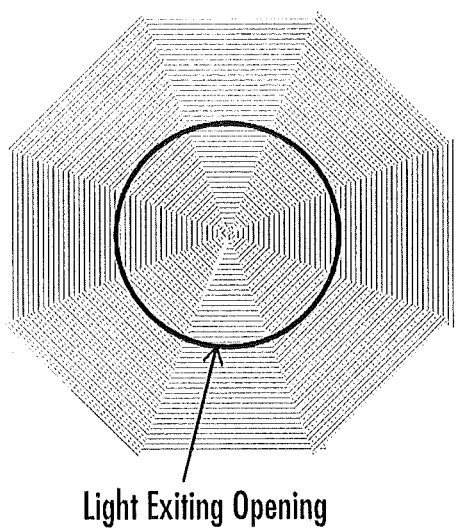
FIG. 27A is a plan view illustrating the light transmissive structure of FIG. 25B centered upon a light exit opening.

This approximately circular array of prisms, combined with additional diffusion, modifies a Lambertian light distribution approximately into a circular 2D batwing distribution. FIG. 26 plots measured output of the LED luminaire passed first through this prism array, with the prism side facing the light source, and then through a gentle (15 degree FWHM) diffuser. This result demonstrates the feasibility of creating a 2D circular batwing distribution from a typical light source using a single large pattern element. In above experiment, the multi-prism plate is centered upon the round downlight aperture, as shown in FIG. 27A.

Figure 27B:
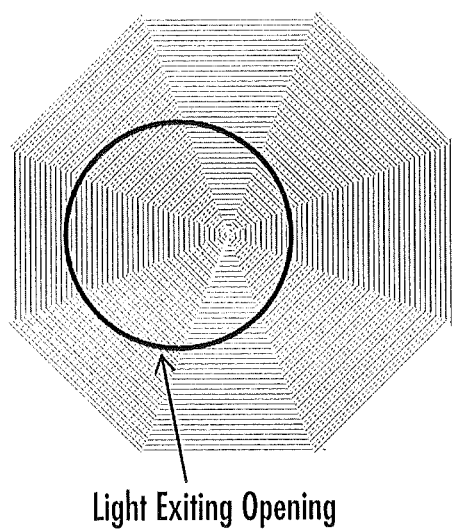
FIG. 27B is a plan view illustrating the light transmissive structure of FIG. 25B misaligned with a light exit opening.
Figure 28:
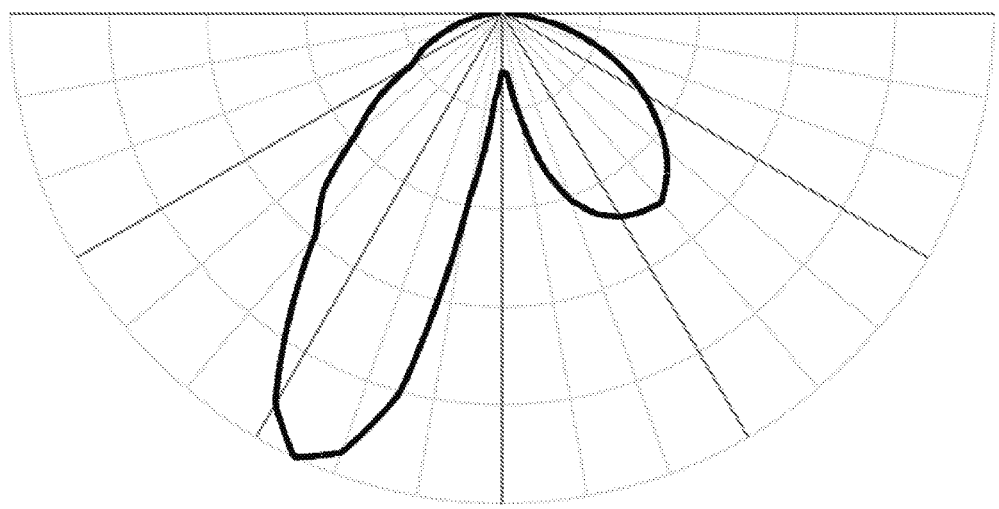
FIG. 28 is a chart illustrating the light distribution using the configuration of FIG. 27B.

In a second experiment, the multi-prism plate was purposely misaligned from the center of the luminaire's light exit region, as shown in FIG. 27B. FIG. 28 shows the resulting measured luminous intensity distribution, which has become asymmetric. Like this multi-prism plate, a true concentric circular prism array would create a circular (and symmetric) 2D batwing distribution when aligned substantially to the center of the light source, and could be used to create other useful distributions, including a one-sided batwing distribution, when aligned to points not centered on the light source.

Figure 29:
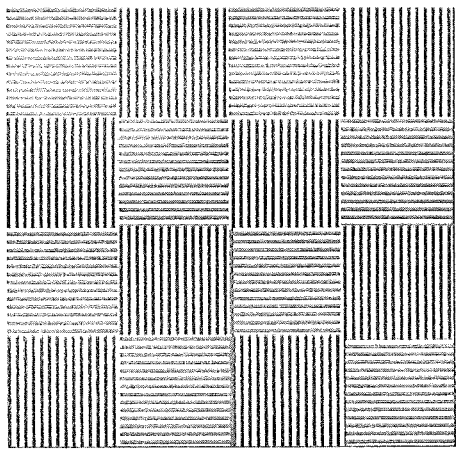
FIG. 29 is a plan view of a light transmissive structure according to some embodiments described herein.

In other embodiments, a 2D batwing diffuser is created using an arrangement of straight (linear) prisms shown in FIG. 29 on one side of a translucent substrate. Prisms with pitch of 100 microns are arrayed in elements (in this case squares) 1400 microns in size, in two alternating prism orientation angles, 0 and 90 degrees. In any small representative area of about 1 square inch in size, the proportion of prisms at 0 and 90 degrees is approximately equal. Upon illumination, the light distribution of such a 2D batwing diffuser is the sum of the light distributions of linear 1D prisms oriented at 0 and 90 degrees, respectively. On spatial scales ranging from several inches to several feet, the 2D batwing diffuser appears approximately uniform.

Figure 30:
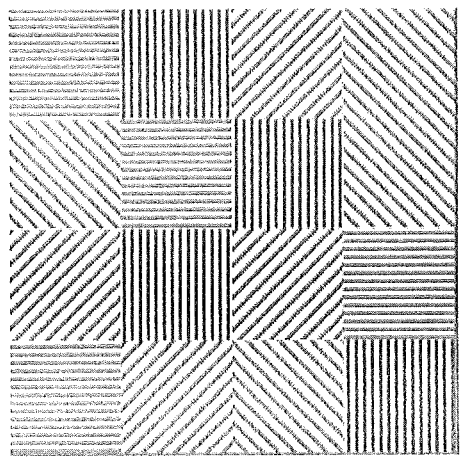
FIG. 30 is a plan view of a light transmissive structure according to some embodiments described herein.

In other embodiments, a 2D batwing diffuser is created using an arrangement of straight (linear) prisms shown in FIG. 30 on one side of a translucent substrate. Prisms with pitch of 200 microns are arrayed in elements (in this case squares) 2800 microns in size, in four prism orientation angles, 0, 45, 90, and 135 degrees. In a representative area of about 1 square inch in size, all four of these angles are represented in substantially equal proportion. Upon illumination, the light distribution of such a 2D batwing diffuser is the sum of the light distributions of linear 1D prisms, and approximates a radially-symmetric 2D batwing distribution.

In other embodiments, a 2D batwing diffuser is created using an arrangement of straight (linear) prisms on one side of a translucent substrate. Prisms with pitch of 100 microns are arrayed in elements 1400 microns in size. Within each element, the linear prisms have prism orientation angles that are random (that is, any angle between 0 and 180 degrees).

Figure 31:
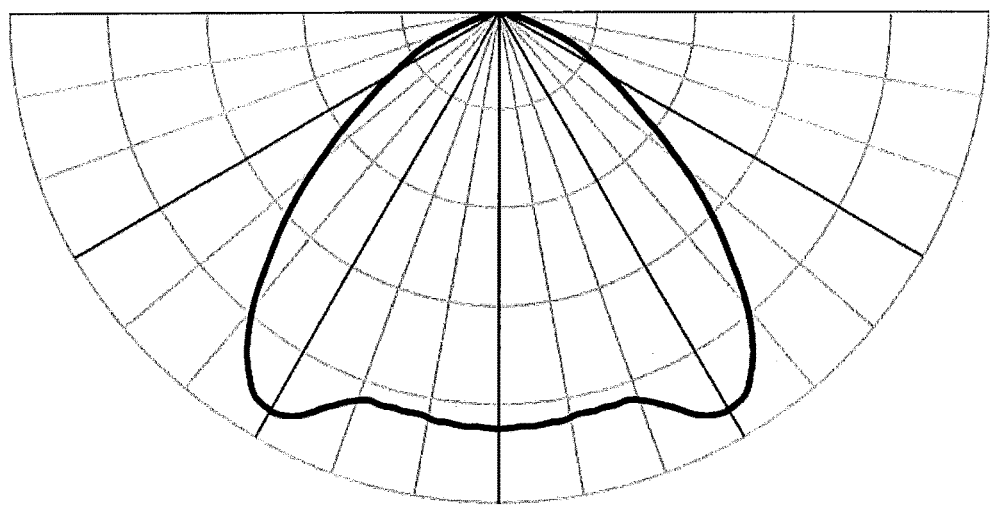
FIG. 31 is a chart illustrating the light distribution of a light source having a FWHM of 40 degrees after passing through the light transmissive structure of FIG. 30 with the prism side facing the light source.

In a representative area 1 square inch in size, a random set of prism orientation angles is represented that is approximately uniform over all angles. Upon illumination by a 40-degree Lambertian light source, the light distribution of such a 2D batwing diffuser is the sum of the light distributions of the constituent linear 1D prisms, and approximates a radially-symmetric 2D batwing distribution, as shown in FIG. 31.

In additional embodiments, a luminaire is provided which uses any of the 2D batwing diffusers of the embodiments above to create a luminaire with a 2D batwing distribution.

Figure 32:
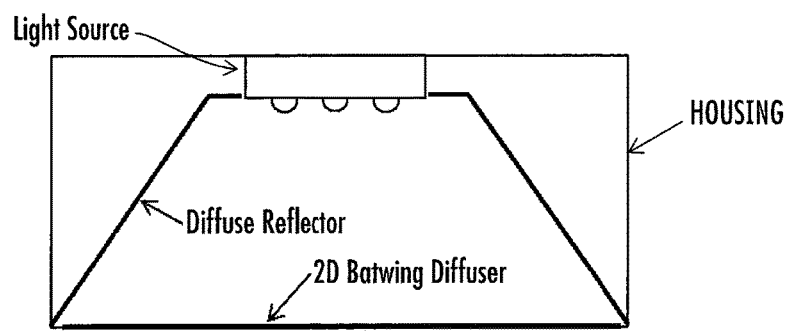
FIGS. 32-39 are simplified cross-sectional views of luminaires according to various embodiments described herein.

In other embodiments, a round luminaire as illustrated in FIG. 32 is provided with a light source, internal diffuse reflector, and 2D batwing diffuser according to the embodiments above. The luminaire produces a 2D batwing distribution.

Note that the 2D batwing distribution is produced by the prism structure of the diffuser, and is not necessarily related to either the shape of the substrate or the shape of the output surface of the luminaire. Thus a luminaire with a light emitting surface that is circular in shape could be made to produce a 2D batwing distribution on a flat surface that is circular, elliptical, square, rectangular, or other shape.

Figure 33:
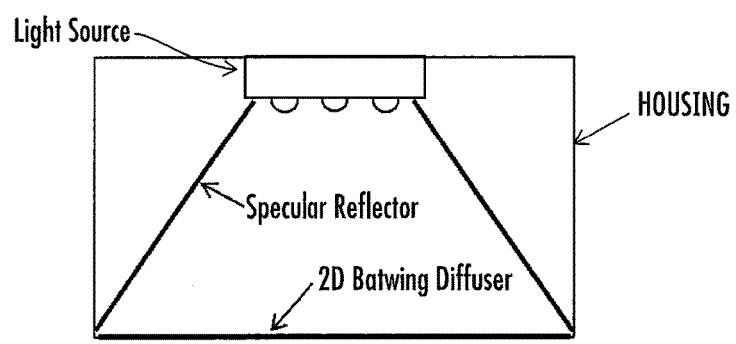

In other embodiments, a round luminaire as illustrated in FIG. 33 is provided with a light source, internal specular reflector, and 2D batwing diffuser according to the embodiments above. The specular reflector is shaped in a substantially truncated conical shape. The luminaire produces a 2D batwing distribution.

Figure 34:
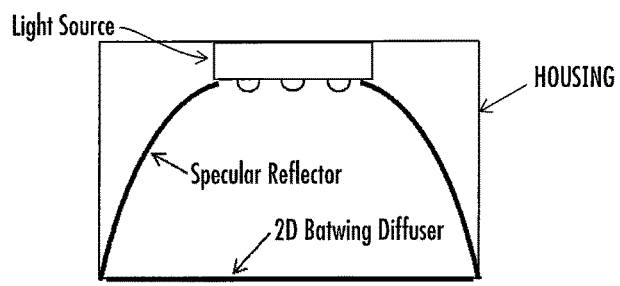

In other embodiments, a round luminaire as illustrated in FIG. 34 is provided with a light source, internal specular reflector, and 2D batwing diffuser according to the embodiments above. The specular reflector is shaped in a curved shape such as an ellipsoid or paraboloid. The luminaire produces a 2D batwing distribution.

Figure 35:
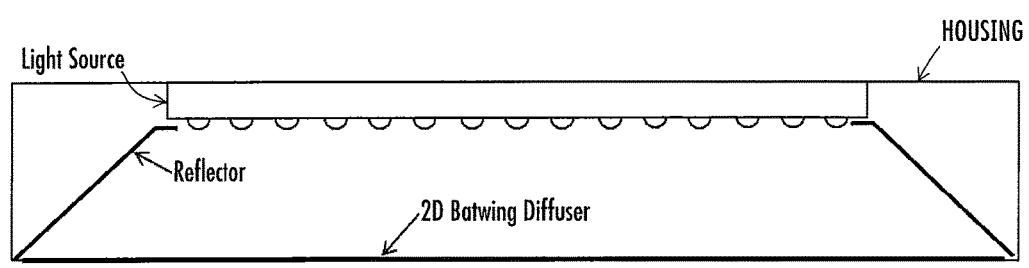

In other embodiments, a rectangular luminaire as illustrated in FIG. 35 is provided with an array of light sources, internal reflector, and 2D batwing diffuser according to the embodiments above. The luminaire produces a 2D batwing distribution.

Figure 36:
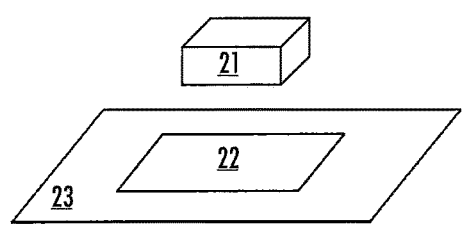

In other embodiments, a rectangular luminaire as illustrated in FIG. 36 has a diffuser with center section 22 surrounded by an outer section 23. The luminaire is provided with a light source or array of light sources 21 located above the central section 22 and a 2D batwing diffuser according to the embodiments above in the center section 22 with prisms facing toward the light source 21, and a conventional diffuser with light to moderate diffusion (such as 20-degree FWHM) in the outer section 23. The luminaire is provided with a specular or diffuse reflector (not shown) closing the cavity between the light source and diffuser to enhance efficiency. The luminaire produces a 2D batwing distribution and reduces luminance at high angles. In another variation of these embodiments, the center section has a shape other than a square as indicated, such as a circle. In another variation of these embodiments, both the conventional diffuser and the 2D batwing diffuser are formed on the same substrate, the conventional diffuser not covering the area covered by the 2D batwing diffuser. In another variation of these embodiments, the conventional diffuser and the 2D batwing diffuser are formed on the same substrate, the conventional diffuser covering the entire surface of the substrate facing away from the light source, and the 2D batwing diffuser covering the center portion of the surface of the substrate facing the light source such that the center portion has both 2D batwing diffuser and the conventional diffuser on opposing sides of the substrate.

Figure 37:
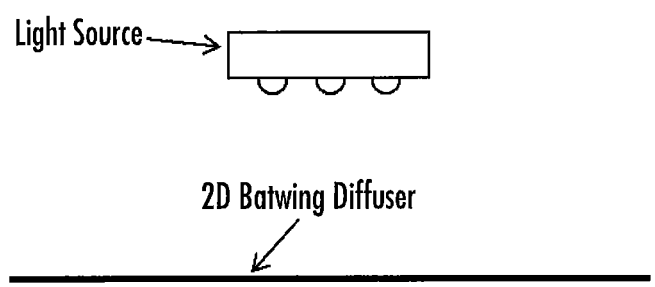

In other embodiments, a 2D batwing diffuser is suspended below a light source, with open gaps beside the light source, such that light transmitted through the 2D batwing diffuser is directed downward in a 2D batwing distribution, and light reflected from the diffuser continues upward to illuminate a ceiling, as shown in FIG. 37. The diffuser can be suspended under the light source via any techniques known in the art (not shown) including cables, a frame at sides or edges, or transparent enclosure. In variations of these embodiments, additional elements such as 2D batwing diffusers, conventional diffusers, baffles and louvers are used to further shape the upward directed light into a batwing distribution.

In additional embodiments, other types of luminaires known in the art can employ a 2D batwing diffuser according to any of the embodiments described herein and produce a 2D batwing distribution, said luminaires including but not limited to downlight, recessed troffer, surface-mount troffer, suspended pendant, suspended linear pendant, wall wash, cove, replacement lamp, PAR lamp, architectural, fine art, outdoor, bollard, aisle, stage/show lighting, movie lighting.

In additional embodiments, luminaires including a 2D batwing diffuser according to any of the embodiments described herein may employ additional elements such as conventional diffusers, additional 2D batwing diffusers, linear batwing diffusers, baffles, louvers, specular reflectors, diffuse reflectors, absorbers, openings, to further modify the light distribution for purposes such as obscuring lamps, enhancing or de-emphasizing nadir suppression, reducing high-angle luminance (glare), or forming asymmetric or one-sided distributions.

Figure 38:
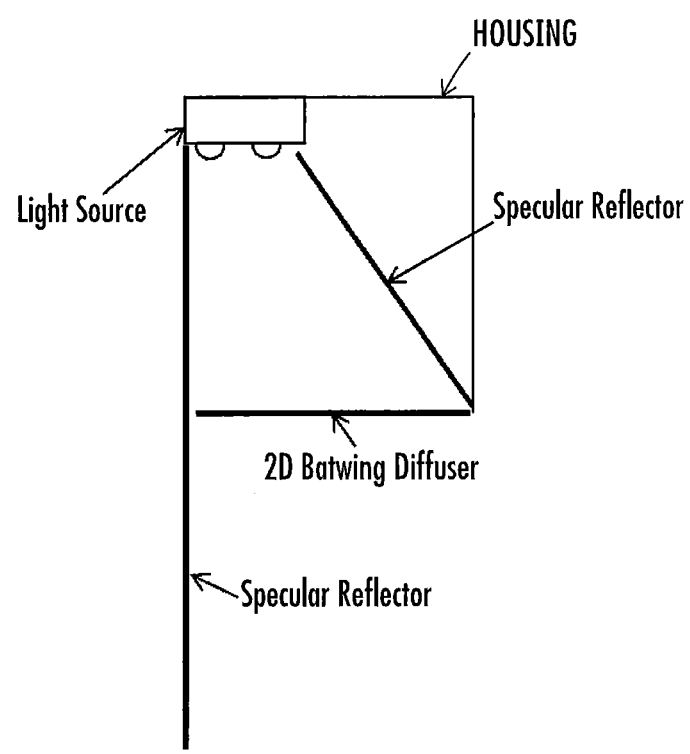

In additional embodiments, one or more specular reflector is used in conjunction with a light source and 2D batwing diffuser according to any of the embodiments described herein, to reflect or "fold" a 2D batwing diffuser, creating a one-sided asymmetrical 2D batwing distribution. An example of this type of reflected design is shown in FIG. 38.

Figure 39:
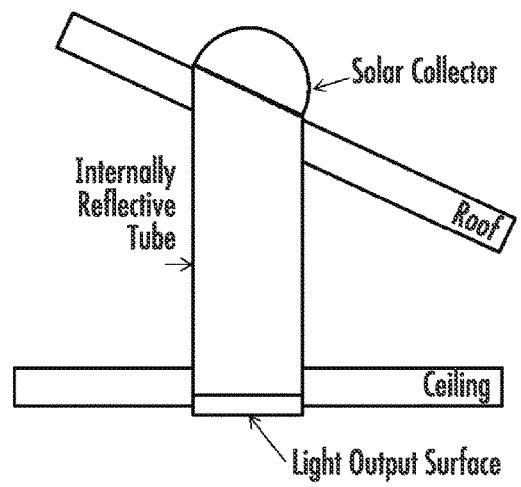

Luminaires are known in the art that collect outdoor light (i.e. direct and/or diffuse solar light) and transmit the light to a desired location, often diffusing the light at that location using a conventional diffuser or other light-transmitting material. A commercially-available example is Solatube, of Vista, Calif. (http://www.solatube.com). In additional embodiments described herein, a luminaire including a solar collector, a light-transmitting member such as tube with reflective inner walls or fiber optic cable assembly, and a light-exiting surface, through which light is emitted into a space and onto a flat surface is provided with a 2D batwing diffuser according to any of the embodiments described herein, and emits light into a 2D batwing distribution, as illustrated in FIG. 39. In additional embodiments, a 2D batwing diffuser according to any of the embodiments described herein is used with a collimated or near-collimated incoming light distribution, creating a 2D batwing distribution.

The use of an appropriate diffuser with a collimated or near-collimated light source can widen the light source into a Lambertian light source. For example, it is known in the art that opal glass will transform nearly any incoming light distribution into an approximately 120-degree Lambertian distribution. In an additional example, it is known in the art that a conventional 60-degree diffuser will transform a collimated source into an approximately 60-degree Lambertian distribution. Thus a 2D batwing diffuser with a collimated or near-collimated light source and an appropriate level of diffusion will perform similarly a 2D batwing diffuser with a Lambertian incoming light distribution.

In additional embodiments, a 2D batwing diffuser according to any of the embodiments described herein is used with a collimated or near-collimated incoming light distribution and a conventional diffuser, creating a 2D batwing distribution.

Figure 40:
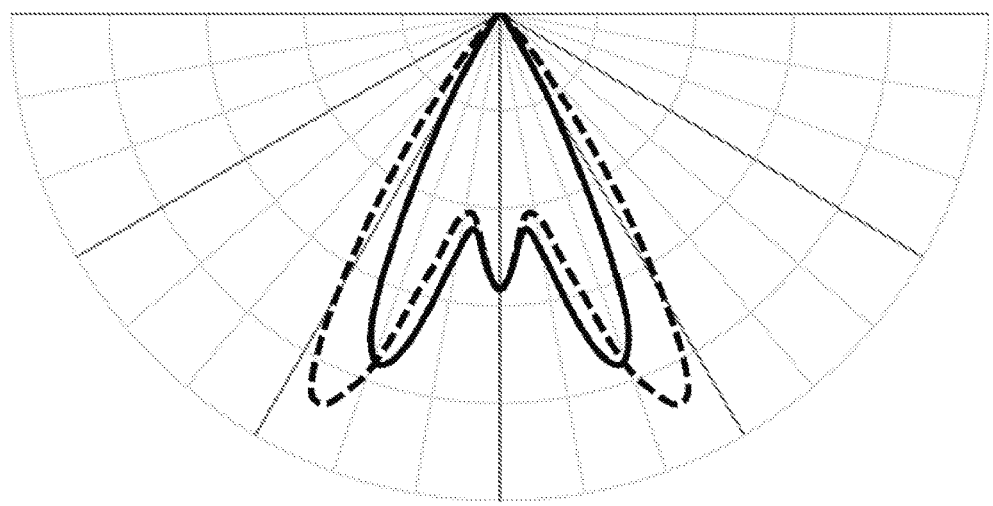
FIG. 40 is a chart illustrating the light distribution of a substantially collimated light source after passing through the light transmissive structures according to various embodiments described herein.

In additional embodiments, a 2D square batwing diffuser according to any of the embodiments described herein is illuminated by a 5-degree substantially-collimated incoming light distribution and results in the square 2D batwing distribution shown in FIG. 40, the solid line representing the measurement at phi=0 degrees and the dashed line representing measurement at phi=45 degrees. The degree of nadir suppression achieved in this case is greater than the ideal for illuminating a flat surface, but may be desirable for certain illumination tasks. There is also an unintentional increase in light near nadir, visible as an additional bump in the center of FIG. 40, which is an artifact of the manufacturing process used to make the diffuser of this embodiment. It likely results from unintentional flat surfaces in the microprism layer. Such an artifact may or may not be desirable, and may be included or removed by appropriate modification of the manufacturing process.

In additional embodiments, a 2D batwing diffuser according to any of the embodiments described herein with included diffusion (such as surface roughness, rounding of prism peaks and/or valleys, curved surfaces, a diffusive substrate, or a diffusive second surface) is used with a collimated or near-collimated incoming light distribution, creating a 2D batwing distribution.

Figure 41:
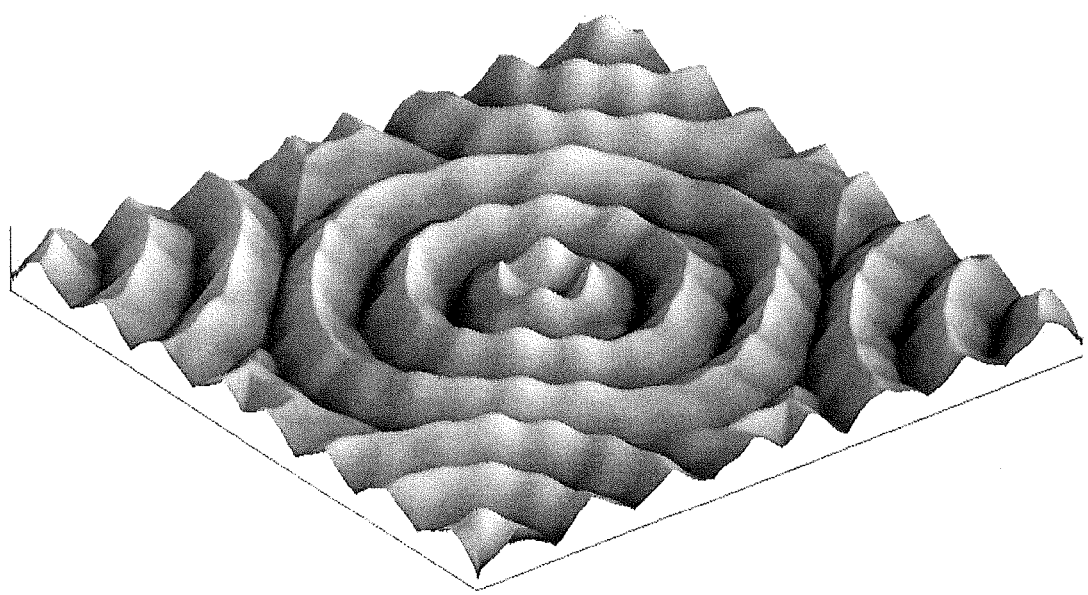
FIG. 41 is an enlarged fragmentary perspective view of a light transmissive structure according to some embodiments described herein.

In additional embodiments, a 2D batwing diffuser according to any of the embodiments described herein with included surface roughness as illustrated in FIG. 41 is used to create a 2D batwing distribution.

Figure 42A:
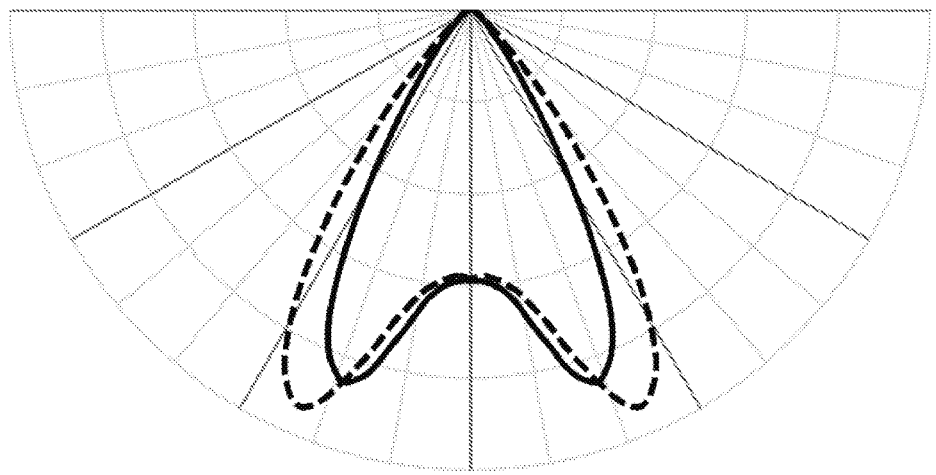
FIG. 42A is a chart illustrating the light distribution of a near-collimated light source after passing through the light transmissive structures according to various embodiments described herein.
Figure 42B:
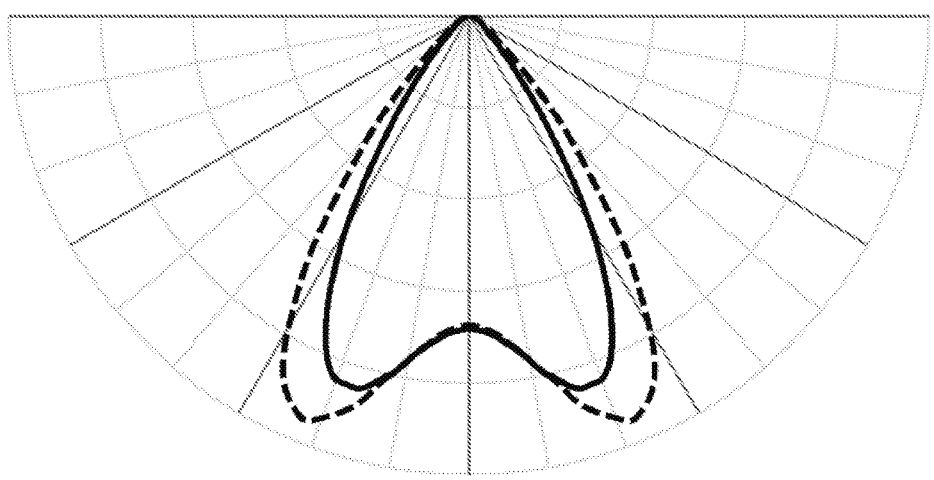
FIG. 42B is a chart illustrating the light distribution of a near-collimated light source after passing through the light transmissive structures according to various embodiments described herein with added surface roughness.

In additional embodiments, a 2D batwing diffuser according to any of the embodiments described herein designed to produce a 2D square batwing light distribution when illuminated by a 50 degree Lambertian incoming light distribution is used with a near-collimated 20-degree distribution, and results in a 2D batwing distribution with more nadir suppression than ideal for illuminating a flat surface, as shown in FIG. 42A, in which the solid line represents the measurement at phi=0 and the dashed line represents the measurement at phi=45 degrees. In related embodiments, a second 2D batwing diffuser according to any of the embodiments described herein is created with substantially the same design, but with the addition of surface roughness comprising random bumps that are approximately the same width as the prism pitch, and approximately $\frac{1}{4}^{th}$ of the height of the prisms. This added surface roughness adds diffusion, reducing the nadir suppression as shown in FIG. 42B to a more desirable level for illuminating a flat surface. In addition, the added surface roughness provides better obscuration of the light sources than embodiment without the surface roughness.

In an additional method, a flat surface is illuminated uniformly by a luminaire with a 2D batwing distribution employing the 2D batwing diffuser of any of the above embodiments.

Manufacturing

The 2D batwing diffusers according to any of the embodiments described herein can be created using many techniques known in the art.

The shape of the prisms may be cast onto a substrate using a suitable master mold, and thermally-curing polymer or ultraviolet (UV) light curing polymer, or the shape may be impressed into a thermoplastic substrate through compression molding or other molding, or may be created at the same time as the substrate using extrusion-embossing or injection molding.

Figure 43:
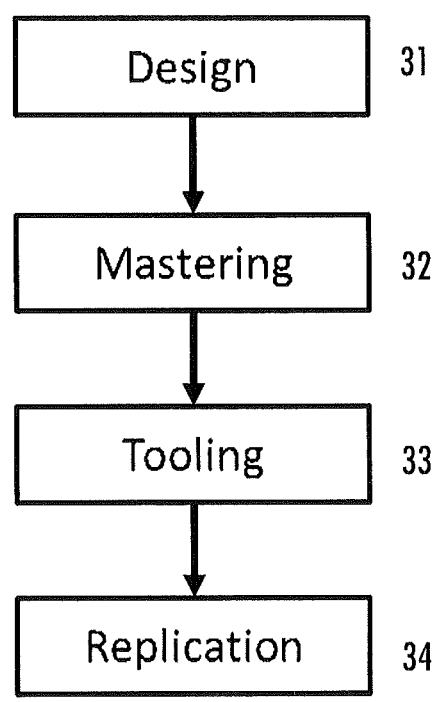
FIG. 43 is a flowchart of methods of fabricating light transmissive structures according to various embodiments described herein.

The microstructures may be produced by replicating a master, as illustrated at Block 34 of FIG. 43. For example, an optical diffuser can be made by replication of a master containing the desired shapes as described in U.S. Pat. No. 7,190,387 B2 to Rinehart et al., entitled Systems And Methods for Fabricating Optical Microstructures Using a Cylindrical Platform and a Rastered Radiation Beam; U.S. Pat. No. 7,867,695 B2 to Freese et al., entitled Methods for Mastering Microstructures Through a Substrate Using Negative Photoresist; and/or U.S. Pat. No. 7,192,692 B2 to Wood et al., entitled Methods for Fabricating Microstructures by Imaging a Radiation Sensitive Layer Sandwiched Between Outer Layers, assigned to the assignee of the present invention, the disclosures of all of which are incorporated herein by reference in their entirety as if set forth fully herein. The masters themselves may be fabricated using laser scanning techniques described in these patents, and may also be replicated to provide diffusers using replicating techniques described in these patents.

In other methods and systems, laser holography, known in the art, is used to create a holographic pattern that creates the desired microstructure in a photosensitive material.

In other methods and systems, projection or contact photolithography, such as used in semiconductor, display, circuit board, and other common technologies known in the art, is used to expose the microstructures into a photosensitive material.

In other systems/methods, laser ablation, either using a mask or using a focused and modulated laser beam, is used to create the microstructures including the indicia in a material.

In other methods and systems, micromachining (also known as diamond machining), known in the art, is used to create the desired microstructure from a solid material.

In other methods and systems, additive manufacturing (also known as 3D printing), known in the art, is used to create the desired microstructure in a solid material.

Variations

Many other variations on the structure may be provided according to various embodiments described herein.

The substrate may be thin, such as a flexible plastic film, or thick, such as a rigid acrylic or polycarbonate sheet. It may be monolithic or include multiple layers, such as a thin plastic film laminated to a thicker rigid substrate using an adhesive layer or other lamination method. The diffuser may be substantially flat, or may take on a curvature (concave or convex; cylinder-like or dome-like) as long as the diffuser still forms a 2D batwing distribution. Additional optical or mechanical layers may be present, such as a cladding layer of differing refractive index disposed outside of the 2D batwing diffuser prism layer.

2D batwing diffusers according to any of the embodiments described herein are designed to accept a light distribution provided by a luminaire's light source and components excluding the 2D batwing diffuser (the "incoming light distribution") and create a useful 2D batwing distribution of a desired shape. In some cases, the incoming light distribution will be Lambertian with 120 degree FWHM. In other cases, the incoming light distribution may be a narrower Lambertian (e.g. 60 degree FWHM), approximately Lambertian, or non-Lambertian.

In these cases, it still may be desirable to shape the incoming light distribution into a 2D batwing distribution, and thus it may be desirable to optimize the design of the 2D batwing diffuser to the incoming light distribution.

Customization of the 2D batwing diffuser to achieve goals, including specific output distribution shapes, accommodating specific incoming light distributions, desired visual appearances, etc., can be achieved by varying many different aspects of the 2D batwing diffuser according to any of the embodiments described herein. Variations in geometry (including prism pitch, curvature, and geometric shape of the prism layout), internal angle, rounding of prism peaks and valleys, surface roughness, etc., can be used. Prisms can be asymmetric (with a gentle-sloping face on one side, and a strongly-sloped face in the other side). The refractive index of the prisms can be varied. Higher refractive indices may result in wider light distribution angles and greater degrees of nadir suppression.

Customization can include many aspects of the output light distribution, including but not limited to varying degrees of nadir suppression, different spreading angles, asymmetry, reduction of high-angle luminance, and beam bending distributions. Many of those distributions are highly desirable to lighting designers.

In some cases, the degree of nadir suppression provided by a given 2D batwing diffuser may be too strong for a given incoming light distribution. This may be particularly true for narrower incoming light distributions, because nadir suppression becomes stronger as the incoming distribution becomes narrower. In addition, with some light sources or diffuser designs, the light distribution created on the desired flat surface may not be smooth enough.

In both of these cases it may be advantageous to add diffusion to the 2D batwing diffuser. If the diffusion is sufficiently strong, it will reduce the nadir suppression created by the 2D batwing diffuser, and smooth the distribution of light projected onto a flat surface.

Adding diffusion to a 2D batwing diffuser can have the additional desirable effect of helping obscure light sources. This can be achieved in many ways, as illustrated in FIG. 44.

Figure 44A:
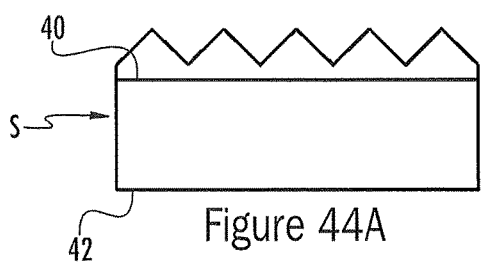
FIG. 44A is a cross-sectional view of a light transmissive structure according to some embodiments described herein.

FIG. 44A shows a cross-section of a typical non-diffused embodiment for reference. The 2D batwing diffuser or light transmissive structure of FIG. 44A includes a substrate S having first and second opposing faces 40, 42 and a plurality of microprisms on the first face 40. The microprisms may be the microprisms in any of the embodiments described herein such as, for example, the microprisms 12 shown in FIG. 13.

As used herein, unless the context clearly indicates otherwise, the term "2D batwing diffuser" can refer to a light transmissive structure such as a substrate having a plurality of microprisms on a face thereof and without additional diffusion features, such as those diffusion features described below in reference to FIGS. 44B-44H.

Figure 44B:
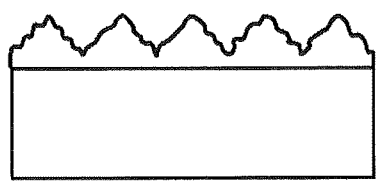
FIGS. 44B-44H are cross-sectional views of light transmissive structures with added diffusion features according to various embodiments described herein.

In one embodiment, depicted in FIG. 44B, diffusion is added to a 2D batwing diffuser according to any of the embodiments described herein by superimposing diffusive surface features. Many conventional surface (microstructure) diffusers include surface features such as microlenses or random roughness. Such surface features can be directly superimposed upon the surface of the prisms of the 2D batwing diffuser, and will add diffusion to the effect of the 2D batwing diffuser.

Figure 44C:
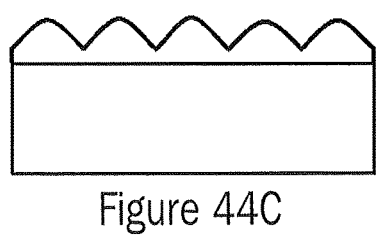

In other embodiments, depicted in FIG. 44C, diffusion is added to a 2D batwing diffuser according to any of the embodiments described herein by rounding the prism tips. In related embodiments the prism tips and/or valleys can be rounded. This rounding reduces nadir suppression and helps obscure light sources.

Figure 44D:
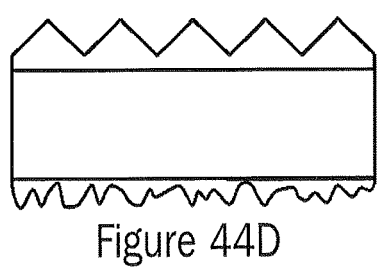

In other embodiments, depicted in FIG. 44D, diffusion is added to a 2D batwing diffuser according to any of the embodiments described herein by creating a conventional surface diffuser such as a microstructure or holographic diffuser on the surface of the substrate opposite the prism layer, using techniques known in the art.

Figure 44E:
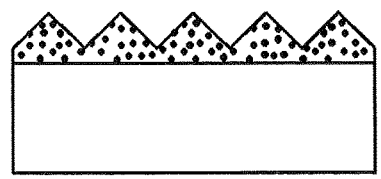

In other embodiments, depicted in FIG. 44E, diffusion is added to a 2D batwing diffuser according to any of the embodiments described herein by introducing light scattering in the prism layer. This can be accomplished for example by incorporating a scattering agent, such as minerals (e.g. TiO2 or Calcium Carbonate), microspheres or beads, particles, phase separated materials, into the liquid UV-curable polymer used to create the prism structure.

Figure 44F:
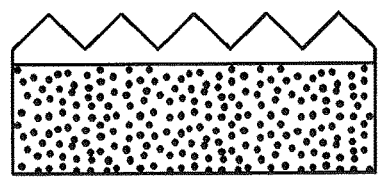

In other embodiments, depicted in FIG. 44F, diffusion is added to a 2D batwing diffuser according to any of the embodiments described herein by incorporating a scattering agent, such as minerals (e.g. TiO2 or Calcium Carbonate), microspheres or beads, particles, phase separated materials, into the substrate material.

Figure 44G:
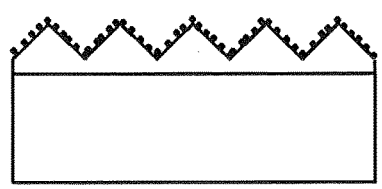

In other embodiments, depicted in FIG. 44G, diffusion is added to a 2D batwing diffuser according to any of the embodiments described herein by conformally coating a diffusive coating onto the surface of the prisms. Diffusive coatings are known in the art, such as a mineral dispersed in a binder polymer.

Figure 44H:
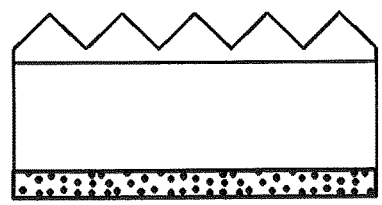

In other embodiments, depicted in FIG. 44H, diffusion is added to a 2D batwing diffuser according to any of the embodiments described herein by combining the transparent substrate with a diffusive layer, said diffusive layer comprising any conventional diffuser known in the art.

In other embodiments, not pictured, diffusion is added to a 2D batwing diffuser according to any of the embodiments described herein by using two layers separated by an air gap, said layers being a 2D batwing diffuser and an conventional diffuser of any type. These embodiments introduce additional optical interfaces between air and the diffuser material, and thus may introduce additional reflections when used in a luminaire, reducing overall efficiency. For this reason, these embodiments may be less preferred.

In some cases, manufacturing of the 2D batwing diffusers described herein results in unintended variations from the desired structure. One such unintended variation can be rounding of the prism peaks and valleys beyond what is desired. For example, in the embodiment of FIG. 13, the peaks and valleys of the prisms are substantially in the plane of the substrate. When these peaks and valleys are rounded by limitations of the manufacturing process, they present a non-negligible surface area which is oriented substantially parallel to the substrate. In this case, it has been experimentally observed by the applicants that this flattening may lead to undesired ghost imaging of LED light sources viewed through the diffuser, and may also result in undesirable additional light near nadir, decreasing the desired nadir suppression provided by the 2D batwing diffuser.

Figure 45:
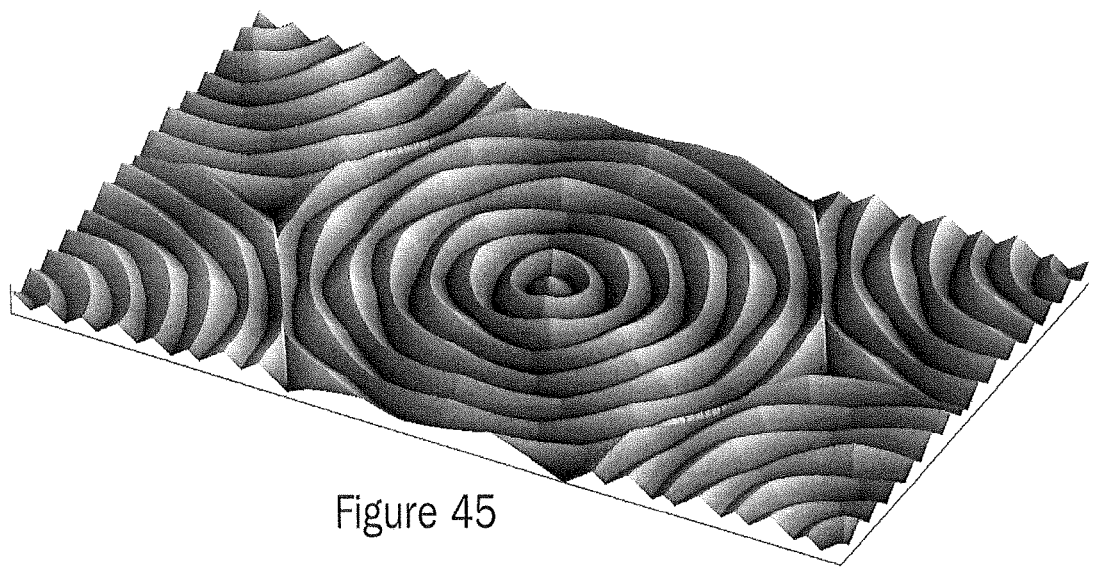
FIG. 45 is an enlarged fragmentary perspective view of a light transmissive structure according to some embodiments described herein.

It is possible to vary the shape of the prisms to create peaks and/or valleys that are no longer substantially parallel to the substrate to reduce these undesirable effects. This can be done for example by providing a ramp in which the body of each prism is varied up (away from the underlying substrate) or down (toward the underlying substrate) as one follows the prism peak around its path. In one such embodiment, as depicted in FIG. 45, the prisms have 60 micron pitch and follow substantially circular paths, and are repeated in a hexagonal array to fill the surface of the diffuser. The prism internal angle is about 90 degrees, and the refractive index is 1.49. The prisms are ramped up and down at approximately 10 degree angle by an additional 20 microns in height as depicted in the figure. When manufactured using a process that rounds the sharp peaks and valleys and illuminated by a Lambertian source incident up on the prism side, this 2D batwing diffuser reduces the ghost imaging and improves the nadir suppression when compared to a similarly designed and manufactured 2D batwing diffuser that does not include the ramping. In related embodiments, the variation in prism tip height can take on forms other than a ramp, such as sinusoidal or random variation. Therefore, the prism height may vary along the prism path. In some embodiments, a respective prism has a generally triangular cross section with a pitch that varies along the prism path.

Figure 46:
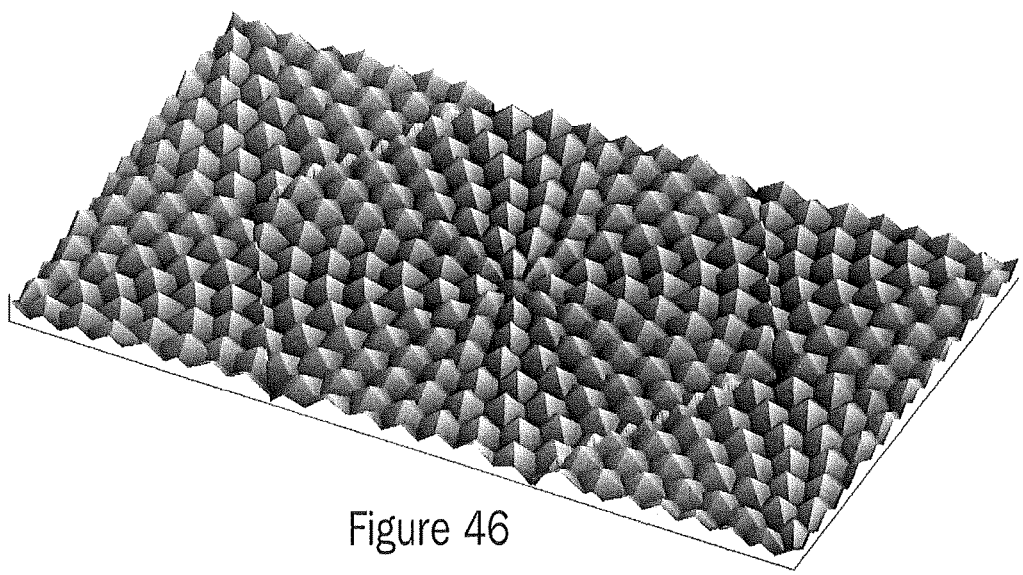
FIG. 46 is an enlarged fragmentary perspective view of a light transmissive structure according to some embodiments described herein.

In a related embodiment, depicted in FIG. 46, the ramp angles are increased until the shapes formed are a pyramid with substantially equal angles. It has been experimentally observed by the applicants that this prism structure, when illuminated by a light source upon the prism side, also creates a 2D batwing light distribution, and has the additional potential advantage of providing a greater degree of visual hiding of LED light sources compared a similarly designed and manufactured 2D batwing diffuser that does not include the pyramidal ramping.

In many cases, the exact effect of the variations in 2D batwing diffuser design according to any of the embodiments described herein need not be directly or completely understood to be optimized, because these variations can be readily designed using mathematical software such as MATLAB, and optimized using optical ray tracing software such as LightTools to achieve specific goals. It is possible with ray tracing software to model the output of a 2D batwing diffuser according to any of the embodiments described herein when presented with a specific incoming light distribution such as an 80 degree Lambertian distribution. It is also possible to make a complete model of a luminaire, so as to optimize the 2D batwing diffuser design according to any of the embodiments described herein and luminaire design to achieve a specific output light distribution from the luminaire.

The performance of a 2D batwing diffuser according to any of the embodiments described herein can be further varied by changing the design of 2D batwing diffuser across the substrate. Any of the variations discussed above could be changed from one location to another, or from one pattern element to another, one prism to another, to randomize the performance of the diffuser. This might be used to reduce nadir suppression in the event that it is too strong for a given incoming light distribution, or to combine other optical functions, such as light-source hiding, and/or visible aesthetic surface patterns.

In some embodiments, a 2D batwing diffuser according to any of the embodiments described herein includes concentric circular prisms arranged in a hexagonal repeat pattern similar to the embodiment of FIG. 13. Each pattern element contains prisms of a randomly or pseudo-randomly chosen prism internal angle, ranging from 70 to 90 degrees and from 80 to 100 degrees in various embodiments. The diffuser produces a 2D batwing distribution.

Elements of Various Embodiments

Various embodiments described herein may be regarded as including the following elements:
General embodiments, except for the one-big-concentric-circle embodiments:
 A first textured surface
 A second surface
 A thickness therebetween;
 The textured surface comprising
  A microprism array, the microprism array comprising a plurality of microprisms with substantially more than one prism orientation angle,
 The microprism array being conceptually divisible into at least 10 sub-areas for which each sub-area contains prismatic microstructures with a substantially the same distribution prism orientation angles as the other sub-areas.
Embodiment 1 focuses on the concentrics:
1. A two-dimensional batwing diffuser comprising
 A first textured surface
 A second surface
 A thickness therebetween;
 The textured surface comprising
  A microprism array, the microprism array comprising a plurality of elements, each element comprising prismatic microstructures arranged in a concentric geometric shape;
 The prismatic microstructures having substantially more than one prism orientation angle.
Embodiment 2 focuses on the "parallel" aspect, that even in concentric circles, they're essentially parallel prisms.
2. A two-dimensional batwing diffuser comprising
 A first textured surface
 A second surface
 A thickness therebetween;

The textured surface comprising
  A microprism array, the microprism array comprising a plurality of elements, each element comprising prismatic microstructures arranged substantially parallel to one another;
  The prismatic microstructures having substantially more than one prism orientation angle.
Additional embodiments:
3. A two-dimensional batwing diffuser comprising
  A first textured surface
  A second surface
  A thickness therebetween;
  The textured surface comprising
  A microprism array, the microprism array comprising a plurality of small areas on the substrate, each area on the substrate comprising prismatic microstructures with more than one prism orientation angle, in which at least some portion of the prismatic microstructures have a prism orientation angle that is at an angle of at least 45 degrees from the prism orientation angle of prismatic microstructures in another portion of the area.
4. Embodiment (3) Where the angle difference is at least 60 degrees
5. Embodiment (3) Where the angle difference is 90 degrees
6. Embodiments (3, 4, or 5) where "small" areas are less than 1-4 square centimeters in 2D projected surface area.
7. Embodiments (1 through 5) where the prism internal angle between 70 and 110 degrees or between 60 and 100 degrees, prism pitch between 10 microns and 3 millimeters.
8. Embodiments (1 through 5) where the Prism internal angle is between 70 and 90 degrees or between 80 and 100 degrees, prism pitch between 10 microns and 1 millimeter.
9. Embodiments (1 through 5) where the second surface is smooth
10. Embodiments (1 through 5) second surface is diffusive with diffusion angle less than about 60 degrees FWHM
11. Embodiments (1 through 5) where the more than one prism orientation angles includes at least 0, 45, 90, and 135 degrees
12. Embodiments (1 through 5) where the more than one prism orientation angles encompasses substantially all angles in the plane of the first textured surface
13. Embodiment 12, where the plurality of prismatic microstructures has a distribution of prism orientation angles that is substantially uniform over all angles in the plane (creates a circularly symmetric distribution)
14. Embodiment 12, where the plurality of prismatic microstructures has a distribution of prism orientation angles with a substantial portion near a first angle, and another substantial portion of the prism orientation angles near a second angle that differs by at least 45 degrees from the first angle (this creates a somewhat rectangular distribution)
15. Embodiment 14, where the prism internal angle is varied as a function of prism orientation angle (this makes the rectangular distribution more rectangular) (FIG. 18—better rectangular/square distribution)
16. Embodiment 14, above where the second angle differs by 90 degrees from the first angle (this creates a square distribution)
17. Embodiments comprising collections of linear prisms (such as FIGS. 29,30)
  a. Deterministic or random
18. A two-dimensional batwing diffuser comprising
  A first textured surface
  A second surface
  A thickness therebetween;
  The textured surface comprising
  A microprism array, the microprism array comprising a plurality of elements with area on the substrate of less than 1 square inch, each element on the substrate comprising prismatic microstructures arranged in a concentric geometric shape.
19. Embodiment 18, in which the concentric geometric shape is substantially an ellipse.
20. Embodiment 19, in which the elliptical concentric geometric shape is substantially a circle.
21. Embodiment 18, in which the concentric geometric shape is substantially a rhombus.
22. Embodiment 21, in which the concentric geometric shape is substantially a square.
23. Embodiment 18, in which the concentric geometric shape is substantially a shape that fits between a rectangle and its inscribed ellipse.
24. Embodiment 18, in which the concentric geometric shape is a shape that fits between a square and its inscribed circle.
25. Embodiment 18, in which the concentric geometric shape is a shape that fits between a rhombus and its inscribed ellipse.
26. Embodiments 18 through 25, in which the prism internal angle is varied as a function of the prism orientation angle.
27. Embodiment 22, in which the prism internal angle is varied as a function of the prism orientation angle.
28. Embodiment 27, in which the prism internal angle for a prism of a given orientation angle is smaller in inverse proportion to the prevalence of the given orientation angle in terms of substrate surface area.
29. An embodiment related to random continuous orientations of prisms (FIGS. 21,22)
30. An embodiment related to first surface prisms having additional roughness (to create diffusion)
31. An embodiment related to first surface deviates from a prism shape (curved sides, or rounded peaks or valleys) to create diffusion
32. A luminaire with two-dimensional batwing light distribution employing the two-dimensional batwing diffuser of any of the embodiments.
33. A luminaire with two-dimensional one-sided batwing light distribution employing the two-dimensional batwing diffuser of any of the embodiments.
34. A method of forming a two-dimensional batwing light distribution by passing light through the two-dimensional diffuser of any of the embodiments.
35. Embodiments where either side of the material is further embedded in another material.

Various embodiments have been described above with reference to the accompanying drawings. Other embodiments may take many different forms and should not be construed as limited to the embodiments set forth herein. Rather, these embodiments are provided so that this disclosure will be thorough and complete, and will fully convey the scope of the invention to those skilled in the art.

When an element is referred to as being on, coupled or connected to/with another element, it can be directly on, coupled or connected to/with the other element or intervening elements may also be present. In contrast, if an element is referred to as being directly on, coupled or connected to/with another element, then no other intervening elements are present. As used herein, the term "and/or" includes any and all combinations of one or more of the associated listed items. The symbol "/" is also used as a shorthand notation for "and/or".

It will be understood that although the terms first and second are used herein to describe various regions, layers and/or sections, these regions, layers and/or sections should not be limited by these terms. These terms are only used to distinguish one region, layer or section from another region, layer or section. Thus, a first region, layer or section discussed above could be termed a second region, layer or section, and similarly, a second region, layer or section could be termed a first region, layer or section without departing from the teachings of the present invention. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," "includes" and/or "including", "have" and/or "having" (and variants thereof) when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A light transmissive structure comprising:
   a light transmissive substrate having first and second opposing faces; and
   an array of microprism elements on the first face,
   wherein: (i) the light transmissive structure is configured to receive light from a light source facing and spaced apart from the first face in a direction perpendicular to the substrate and positioned independent of any particular one of the microprism elements in a plane parallel to the substrate; and (ii) the array of microprism elements are configured to distribute the light emerging from the second face in a 2D batwing distribution;
   wherein a respective microprism element comprises a plurality of concentric circular microprisms;
   wherein the array of microprism elements substantially covers the first face of the substrate.

2. The light transmissive structure of claim 1 in combination with at least one light source and a housing that is configured to hold the at least one light source and the light transmissive substrate so that light from the light source impinges on the first face of the substrate and emerges from the second face of the substrate in a 2D batwing distribution.

3. The combination of claim 2 wherein the housing defines a light exit surface area where the substrate is held, and wherein a respective microprism element has an area on the first face of the substrate that is at least one order of magnitude smaller than the light exit surface area.

4. The combination of claim 3 wherein a respective microprism element has an area on the first face of the substrate that is at least two orders of magnitude smaller than the light exit surface area.

5. The combination of claim 3 wherein a respective microprism element has an area on the first face of the substrate that is at least four orders of magnitude smaller than the light exit surface area.

6. The combination of claim 2 wherein the housing defines a light exit surface area where the substrate is held, and wherein the array of microprism elements on the first face of the substrate extends over substantially the entire light exit surface area.

7. The combination of claim 2 wherein the light source is an array of LEDs with a spacing between adjacent LEDs, and wherein a respective microprism element has a size that generally corresponds to the spacing between adjacent LEDs.

8. The light transmissive structure of claim 1 wherein at least some of the microprisms have a generally triangular cross section with a peak, the cross section taken in a plane perpendicular to the first face of the substrate.

9. The light transmissive structure of claim 8 wherein the peak is generally parallel to the first face of the substrate.

10. The light transmissive structure of claim 8 wherein the peak is a sharp peak.

11. The light transmissive structure of claim 8 wherein the peak is a rounded peak.

12. The light transmissive structure of claim 8 wherein:
    a respective microprism has an internal angle defined by the peak of between about 60 and 100 degrees; and
    a respective microprism has a pitch of between about 10 microns and 3 mm.

13. The light transmissive structure of claim 8 wherein:
    a respective microprism has an internal angle of between about 70 and 90 degrees; and
    a respective microprism has a pitch of between about 10 microns and 1 mm.

14. The light transmissive structure of claim 1 further comprising at least one diffusion feature.

15. The light transmissive structure of claim 14 wherein the diffusion feature comprises surface roughness on at least some of the microprisms.

16. The light transmissive structure of claim 14 wherein the diffusion feature comprises a diffuser on the second face of the substrate.

17. The light transmissive structure of claim 14 wherein the diffusion feature comprises a light scattering agent in at least some of the microprisms and/or in the substrate.

18. The light transmissive structure of claim 14 wherein the diffusion feature comprises a diffusive coating on at least some of the microprisms.

19. The light transmissive structure of claim 1 wherein at least some of the microprisms have a generally triangular cross section with a peak, the cross section taken in a plane perpendicular to the first face of the substrate, and have a prism internal angle defined by the peak with the prism internal angle varying as a function of a prism orientation angle that is measured relative to an edge of the substrate in a plane defined by the substrate.

20. The light transmissive structure of claim 6 wherein portions of the microprisms having prism orientation angles of about 45 degrees and 135 degrees have a first prism internal angle that is less than a second prism internal angle of portions of the microprisms having prism orientation angles of about 0 degrees and 90 degrees.

21. The light transmissive structure of claim 1 wherein a respective microprism element is generally hexagonal.

22. The light transmissive structure of claim 1 wherein a respective microprism element is generally square.

23. The light transmissive structure of claim 1 wherein a respective microprism element has an area of less than about 1 square centimeter on the second face of the substrate.

24. The light transmissive structure of claim 1 wherein a respective microprism element has an area of about 0.1 square centimeters or less on the second face of the substrate.

25. The light transmissive structure of claim 1 wherein a respective microprism is undetectable by the naked eye.

26. The light transmissive structure of claim 1 wherein adjacent microprism elements are in contact with one another.

27. The light transmissive structure of claim 1 wherein the array of microprism elements comprises gaps between at least some of the microprism elements, the light transmissive structure further comprising gap-filling microstructures in at least some of the gaps.

28. The light transmissive structure of claim 1 wherein at least some of the microprisms have a generally triangular cross section with a peak, the cross section taken in a plane perpendicular to the first face of the substrate, the peak having a height relative to the first face of the substrate that varies as a function of a prism orientation angle that is measured relative to an edge of the substrate.

29. The light transmissive structure of claim 1 wherein the light transmissive structure is configured to receive light having a Lambertian distribution from a light source facing the first face and distribute the light emerging from the second face in a 2D batwing distribution.

30. The light transmissive structure of claim 1 wherein the light transmissive structure is configured to receive light having a light distribution having a Full Width at Half Maximum (FWHM) of at least about 30 degrees from a light source facing the first face and distribute the light emerging from the second face in a 2D batwing distribution.

31. The light transmissive structure of claim 1 wherein the light transmissive structure is configured to receive light having a light distribution having a Full Width at Half Maximum (FWHM) of at least about 40 degrees from a light source facing the first face and distribute the light emerging from the second face in a 2D batwing distribution.

32. The light transmissive structure of claim 1 wherein the light transmissive structure is configured to receive light having a light distribution having a Full Width at Half Maximum (FWHM) of at least about 60 degrees from a light source facing the first face and distribute the light emerging from the second face in a 2D batwing distribution.

33. The light transmissive structure of claim 1 wherein the light transmissive structure is configured to receive light having a light distribution having a Full Width at Half Maximum (FWHM) of at least about 80 degrees from a light source facing the first face and distribute the light emerging from the second face in a 2D batwing distribution.

34. The light transmissive structure of claim 1, wherein a respective microprism follows a prism path along the first face of the substrate, wherein the microprism has a generally triangular cross section with a peak and a pitch, the cross section taken in a plane perpendicular to the first face of the substrate, and wherein: (i) the peak has a height relative to the first face of the substrate that varies along the prism path; and/or (ii) the pitch varies along the prism path.

35. The light transmissive structure of claim 1 in combination with at least one light source wherein the light transmissive substrate is suspended under the light source so that light from the light source impinges on the first face of the substrate and emerges from the second face of the substrate in a 2D batwing distribution.

36. The light transmissive structure of claim 1 wherein the second face is smooth.

37. The light transmissive structure of claim 1 wherein the second face is planar.

38. A luminaire comprising:
a housing;
a light source held in the housing;
a light transmissive structure held in the housing, the light transmissive structure comprising:
   a light transmissive substrate having first and second opposing faces; and
   an array of microprism elements on the first face,
wherein the light transmissive structure is configured to receive light from the light source facing the first face and distribute the light emerging from the second face in a 2D batwing distribution;
wherein the light source is spaced apart from the first face in a direction perpendicular to the substrate and is positioned independent of any particular one of the microprism elements in a plane parallel to the substrate;
wherein a respective microprism element comprises a plurality of concentric circular microprisms;
wherein the array of microprism elements substantially covers the first face of the substrate.

* * * * *

UNITED STATES PATENT AND TRADEMARK OFFICE
CERTIFICATE OF CORRECTION

PATENT NO. : 10,072,816 B2
APPLICATION NO. : 14/308293
DATED : September 11, 2018
INVENTOR(S) : Shen et al.

Page 1 of 1

It is certified that error appears in the above-identified patent and that said Letters Patent is hereby corrected as shown below:

In the Specification

Column 14, Line 66: Please correct "680" to read -- '680 --

In the Claims

Column 35, Claim 20, Line 5: Please correct "claim 6" to read -- claim 19 --

Signed and Sealed this
Fourth Day of December, 2018

Andrei Iancu
*Director of the United States Patent and Trademark Office*